(12) United States Patent
Nguyen et al.

(10) Patent No.: US 10,832,548 B2
(45) Date of Patent: Nov. 10, 2020

(54) ADVANCED INDUSTRIAL SAFETY NOTIFICATION SYSTEMS

(71) Applicant: Rockwell Automation Technologies, Inc., Mayfield Heights, OH (US)

(72) Inventors: Thong T. Nguyen, New Berlin, WI (US); Paul D. Schmirler, Glendale, WI (US); Kyle Crum, Bayside, WI (US); David A. Vasko, Hartland, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/398,495

(22) Filed: Apr. 30, 2019

(65) Prior Publication Data

US 2019/0340909 A1    Nov. 7, 2019

Related U.S. Application Data

(60) Provisional application No. 62/666,068, filed on May 2, 2018, provisional application No. 62/666,240, filed on May 3, 2018.

(51) Int. Cl.
  *G08B 21/00*  (2006.01)
  *G08B 21/02*  (2006.01)
(52) U.S. Cl.
  CPC .................... *G08B 21/02* (2013.01)
(58) Field of Classification Search
  CPC ....................................... G08B 21/02
  USPC ....................................... 340/686.6
  See application file for complete search history.

(56) References Cited

U.S. PATENT DOCUMENTS

| | | | |
|---|---|---|---|
| 2010/0121480 A1* | 5/2010 | Stelzer | B65G 1/1373 700/215 |
| 2012/0123563 A1* | 5/2012 | Drinkard | F16P 3/142 700/13 |
| 2013/0201292 A1* | 8/2013 | Walter | F16P 3/14 348/47 |
| 2016/0180668 A1* | 6/2016 | Kusens | G16H 40/20 348/152 |
| 2016/0223652 A1* | 8/2016 | Bosse | G01S 7/4808 |
| 2016/0350973 A1* | 12/2016 | Shapira | G06F 3/011 |
| 2017/0210017 A1* | 7/2017 | Yamamoto | B25J 9/1697 |
| 2017/0287217 A1* | 10/2017 | Kim | G08G 1/166 |
| 2017/0292650 A1* | 10/2017 | Namou | F16P 3/144 |
| 2017/0364153 A1* | 12/2017 | Kazansky | G06F 3/0304 |
| 2018/0089524 A1* | 3/2018 | Takahashi | G06K 9/46 |
| 2018/0365888 A1* | 12/2018 | Satzoda | G06N 3/0454 |
| 2019/0033989 A1* | 1/2019 | Wang | G06F 3/0346 |

* cited by examiner

*Primary Examiner* — Naomi J Small
(74) *Attorney, Agent, or Firm* — Amin, Turocy & Watson, LLP

(57) ABSTRACT

An industrial visualization system defines and enforces a virtual safety shield comprising a three-dimensional space surrounding a wearer of a client device. The dimensions of the virtual safety shield are defined by a specified safe distance surrounding the user that allows sufficient reaction time in response to notification that the wearer is at risk of interacting with a safety zone, hazardous machinery, or vehicles within the plant. If a boundary of a safety zone or hazardous equipment falls within the three-dimensional space defined by the virtual safety shield, the system sends a notification to the user's client device, or places the hazardous equipment in a safe operating mode.

20 Claims, 19 Drawing Sheets

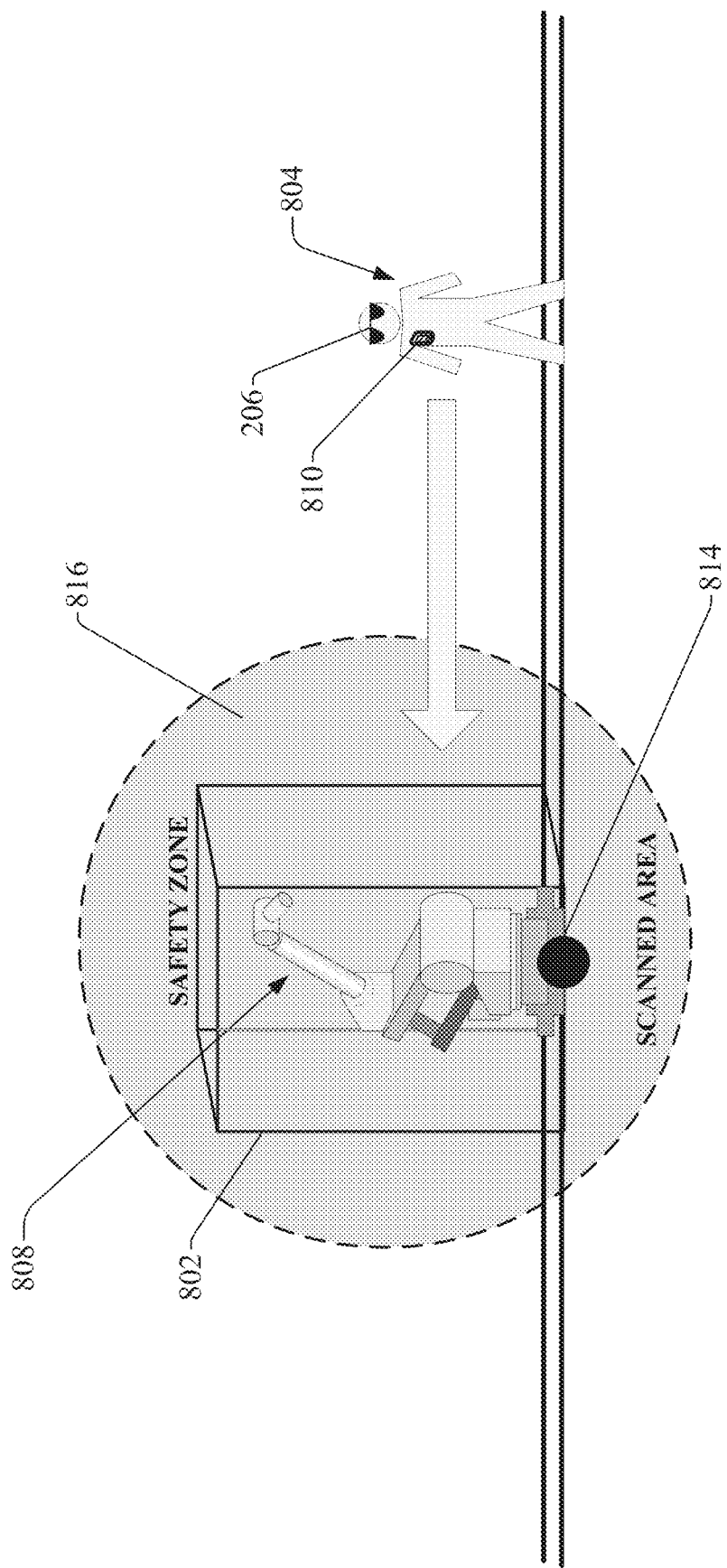

ADVANCED INDUSTRIAL SAFETY NOTIFICATION SYSTEMS

CROSS-REFERENCE TO RELATED APPLICATIONS

This application claims priority to U.S. Provisional Application Ser. No. 62/666,068, filed on May 2, 2018, entitled "AUGMENTED REALITY SAFETY SHIELD," and U.S. Provisional Application Ser. No. 62/666,240, filed on May 3, 2018, entitled "ADVANCED INDUSTRIAL SAFETY NOTIFICATION SYSTEMS." The entireties of these related applications are incorporated herein by reference.

BACKGROUND

The subject matter disclosed herein relates generally to industrial automation systems, and, more particularly, to visualization of industrial data and notification of potential hazard situations

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a local scanner component configured to perform a scan of a vicinity surrounding the system and to generate, based on the scan, mapping data representing objects and surfaces within the vicinity; and a local safety shield component configured to define a three-dimensional virtual safety shield around the local scanner based on a defined minimum safe distance, identify, based on a result of an analysis performed on the mapping data, an obstacle within the vicinity surrounding the system, and in response to determining that the virtual safety shield overlaps with the obstacle, generate a notification.

Also, one or more embodiments provide a method, scanning, by a system comprising a processor, a space surrounding the system; generating, by the system based on the scanning, mapping data that models objects and surfaces within the space surrounding the system; defining, by the system, a three-dimensional virtual safety shield around the system based on a defined minimum safe distance; identifying, by the system based on a result of an analysis performed on the mapping data, an obstacle within the space surrounding the system; and in response to determining that the virtual safety shield overlaps with the obstacle, generating, by the system, a notification.

Also, according to one or more embodiments, a non-transitory computer-readable medium is provided having stored thereon instructions that, in response to execution, cause a wearable device to perform operations, the operations comprising scanning a vicinity surrounding the wearable device; generating, based on the scanning, mapping data that describes objects and surfaces within the vicinity; defining a three-dimensional virtual safety shield around the wearable device based on a defined minimum safe distance; identifying, based on a result of an analysis performed on the mapping data, an obstacle within the space surrounding the wearable device; and in response to determining that the virtual safety shield overlaps with the obstacle, generating a notification.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 8B is a diagram illustrating another implementation for preventing nuisance trips of an industrial safety system caused by a person entering a safety zone of an industrial facility.

DETAILED DESCRIPTION

Figure 1:
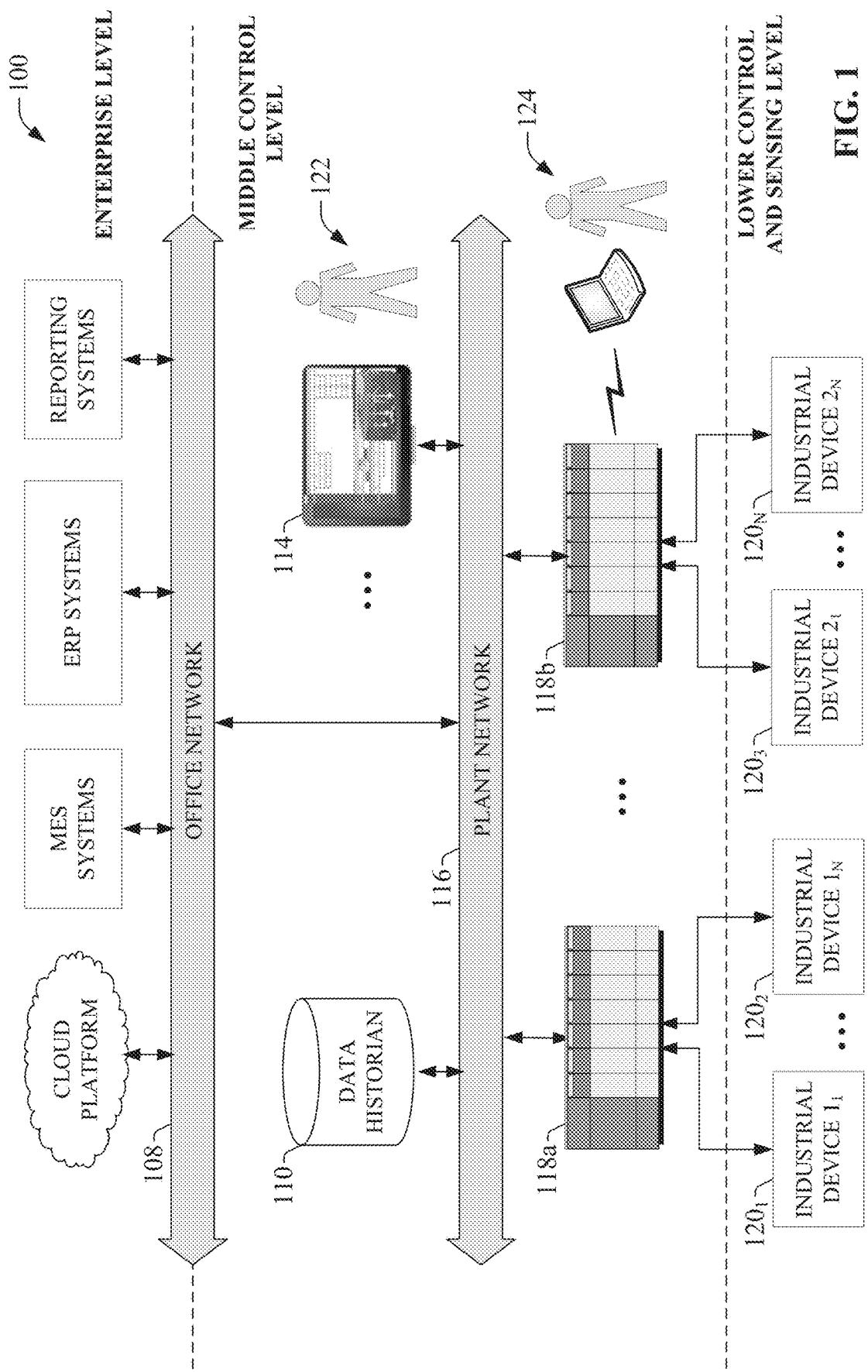
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or a hybrid device that combines controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems.

Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Common Industrial Protocol (CIP), Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Typically, in order to view information relating to the industrial processes carried out by the machines and devices that make up industrial control environment 100, users must either rely on pre-developed interface display screens executing on HMIs 114 (see user 122), or directly connect to the devices using a portable computer in order to view control programming and device configurations (see user 124). While these data visualization systems allow a user to view relevant data values and alarms associated with the various machines and devices, the localized nature of these systems requires the user to be physically near an HMI terminal or industrial controller in order to view operational and status data for a given industrial system or machine. Moreover, HMI displays and controller programming tools provide little in the way of trouble-shooting guidance or analysis in the event of a machine fault or other performance issue. Typically, the manner of presenting machine and device data via HMI screens or controller programming tools requires the user to visually correlate the data presented on the screens with the user's own direct view of the relevant machines or devices.

When diagnosing problems, maintenance personnel are often required to search several of these sources of information individually, using several different software packages specific to the respective data sources being searched. Moreover, searching for information pertaining to a particular device or machine often requires an extensive knowledge of the overall industrial system in order to locate the data source to be searched (e.g., in order to locate the appropriate industrial controller or HMI terminal), as well as to identify the relevant operator screens and control program routines. Individually searching each of these data sources in connection with solving a system downtime issue or other problem can delay correction of maintenance issues, resulting in lost revenue and scheduling problems. Also, if an operator or maintenance person is not near an information source—such as an HMI terminal—at the time an operational or maintenance issue occurs, the user may not be notified of the issue in a timely fashion.

The possibilities of applying augmented reality (AR), mixed reality (MR), and virtual reality (VR) technologies to industrial environments are being explored to address these and other issues. In an example scenario, AR, MR, or VR presentations (referred to collectively herein as AR/MR/VR presentations) can be generated and delivered to a user via a wearable computer or other device. AR/MR/VR presentations generated by such system can comprise three-dimensional (3D) holographic views of a plant facility or a location within a plant facility (e.g., a work area, a production line, etc.). The holographic views may be delivered to a wearable visualization computer, which renders the 3D view as a function of the user's current location and/or orientation. Views of the factory environment rendered by these presentations can include, for example, scaled down views of a factory floor area, which affords the user an interactive external overview of the area, as well as plant-floor views that render a realistic presentation of the factory floor area from the point of view of a person standing within the environment. In the case of AR presentations, a wearable device can enhance a user's natural view of a surrounding production area by superimposing operational and status data over the user's view on or near representations of the relevant industrial devices or control panels. VR presentations may generate a fully synthesized view of a production area that fully supersedes the user's natural view.

For users that are physically located on the plant floor, the AR/MR/VR presentation systems can provide automation system data, notifications, and proactive guidance to the user via modification of the user's view of his or her immediate surroundings. Such modifications may include, for example, superimposing data values or indicators on a user's view of a machine or automation system through the user's wearable computer (or other client device capable of rendering a substantially real-time view of the machine or system). Industrial AR/MR/VR systems may also customize presentation of this information based on the user's role, location, line of sight, type of wearable device, and/or other contextual information.

In some example implementations, the AR/MR/VR presentation systems can obtain "real world" images of an industrial automation device having at least one object via a wearable appliance having at least one image sensory input. Such systems can complement the real-world images on the appliance with virtual or augmented reality images, data, and the like that are associated with at least one identified object of the industrial automation system. The physical industrial automation device or the at least one identified object can be displayed on the appliance together with an augmented/mixed/virtual attribute display of the real world industrial automation device or the at least one object. Example AR/MR/VR presentations can include, but are not limited to, revision information, topology information, controls, firmware, connections, problems, alarms, training, human machine interface, location of controller/equipment, maps, manuals, instructions, line diagrams, ladder programs, locations, avatars, filtered views, cameras, x-ray views, removable views, troubleshooting, how-to's, error proofing, safety robots, customer information, equipment information, filters, line of sight filters, knowledge sharing portals, work flows, view/grab HMI's, line of sight (including distant line of sight), super power line of sight, authentication, privilege control, and asset tracking.

Figure 2:
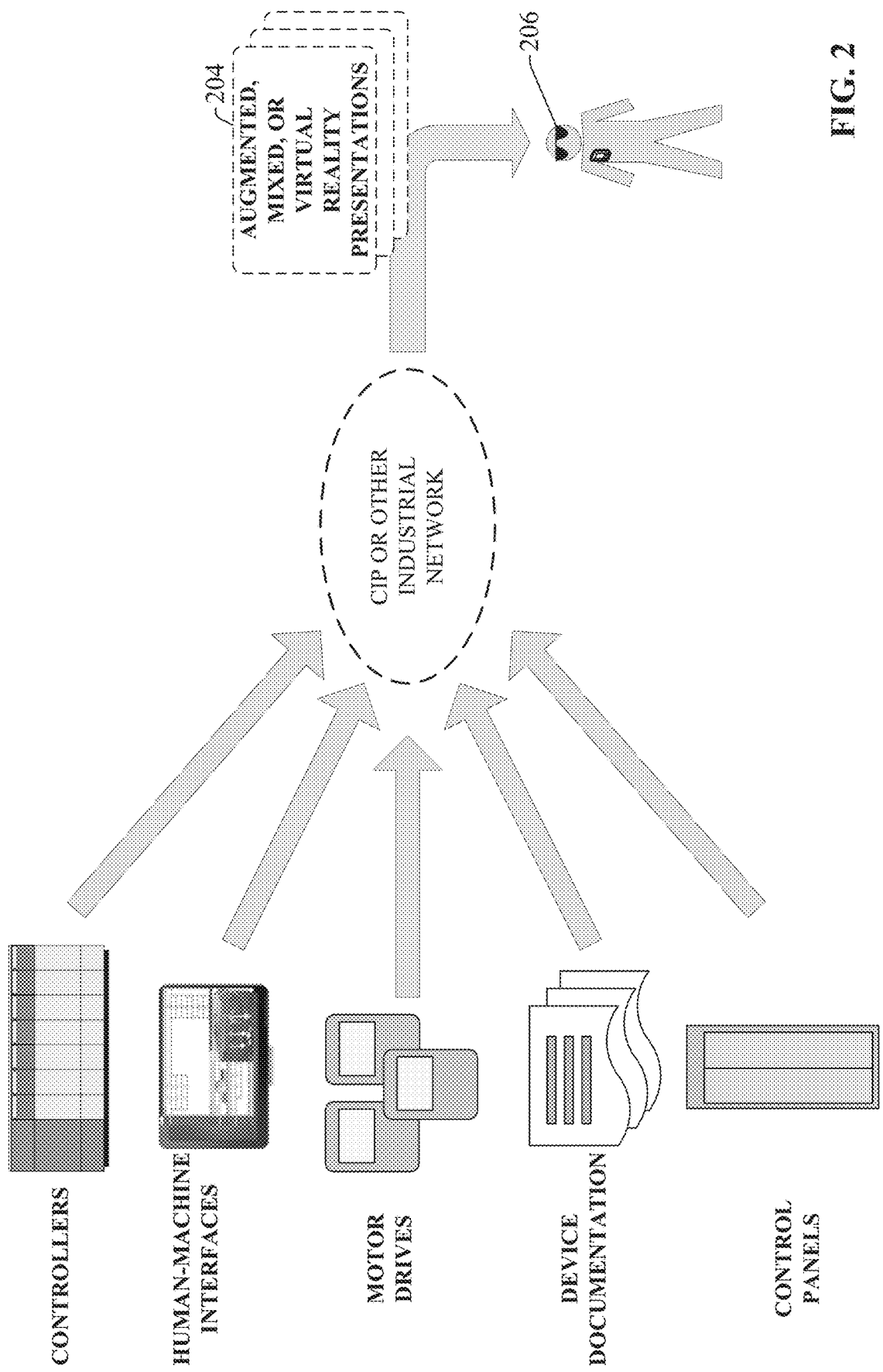
FIG. 2 is a conceptual diagram illustrating presentation of augmented or virtual reality presentations to a wearable appliance or computing device worn by a user.

FIG. 2 is a conceptual diagram illustrating presentation of AR/MR/VR presentations 204 to a wearable appliance 206 or computing device worn by a user. The wearable appliance 206 can comprise any suitable wearable or portable computing device or appliance capable of rendering a virtual reality or augmented reality presentation that substantially surrounds the user's field of view. In some embodiments, wearable appliance 206 may be integrated into a hard hat, bump cap, or other type of protective gear worn by the user. User interactions with the AR/MR/VR presentations 204 can be facilitated by data exchange between a user's wearable appliance 206 and an AR/MR/VR presentation system that acts as a content provider. However, some embodiments of wearable appliance 206 can also be configured to establish direct communication channels with an industrial device in order to send control instructions to such devices. To this end, one or more embodiments of wearable appliance 206 can include communication stacks that establish connectivity between industrial systems residing on an industrial network—such as a common industrial protocol (CIP) network, a DeviceNet network, a ControlNet network, an EthernetIP network, or other networks—and the wearable appliance 206. The wearable appliance 206 can comprise any suitable wearable or portable computing device or appliance capable of rendering an augmented reality, mixed reality, or virtual reality presentation.

In response to various conditions, such as the user's determined role, location, line of sight, or other information, the system can generate and deliver AR/MR/VR presentations to the user's wearable appliance 206. Data used to populate the presentations 204 can be obtained by the presentation system from the relevant industrial devices and delivered as part of the AR/MR/VR presentations 204. In some scenarios, wearable appliance 206 can also obtain at least a portion of the industrial data directly from the industrial devices via the industrial network by virtue of a communication stack that interfaces the wearable appliance 206 to the various devices on the network. Such devices can include individual devices such as controllers, human machine interface (HMI) devices, and motor drives, as well as collections of devices that are housed in a control panel or that make up a controlled industrial machine or system. The presentation system can customize the presentations 204 based on a user's current context, line of sight, type of client device being used by the user (e.g., wearable computer, handheld device, etc.), and/or other relevant information, such that customized augmented reality or virtual reality presentations can be generated based on relevant subsets of data available on the industrial network.

In an example scenario, as a user is viewing an automation system, machine, or industrial device through a wearable computer (or as a substantially real-time video image rendered on the user's client device), the presentation system can monitor the wearable computer to determine the user's location relative to the automation system, the user's current line of sight or field of view, and/or other contextual information indicative of the user's relationship to the automation system. Based on the determined identity of the automation system currently being viewed by the user, the AR/MR/VR presentation system can determine current status information for devices and/or machines that make up the automation system, or for a process being carried out by the automation system. The presentation system can then generate augmented, mixed, or virtual reality presentations and deliver these presentations to the user's wearable appliance; e.g., as graphical or text-based indicators overlaid on the user's field of view, such that each indicator is positioned near the machine or device to which the indicator pertains. For example, if the user's current view encompasses a real or virtualized motor-driven conveyor and a motor drive that controls the motor, the presentation system may superimpose a current operating status of the motor drive (e.g., a current speed, a fault condition, an operating mode, etc.) near the image or view of the motor drive as perceived by the user. If the user is currently viewing a die-cast furnace, the presentation system may superimpose a current furnace temperature near the view of the furnace.

In yet another example, a monitoring component of the presentation system can identify a maintenance issue based on analysis of substantially real-time system data generated by the automation system. In response to detecting such a maintenance issue, the presentation system can deliver a notification to a wearable appliance or other client device associated with a qualified plant technician. To assist the selected user in locating the source of the detected problem, the presentation system can superimpose graphics on the user's view of his or her environment that guide the user to the source of the issue. These graphics can include, for example, arrows or other indicators that guide the user to the affected machine or device, as well as indicators that direct the user's focus of attention to specific areas or components of an automation system, machine, or industrial device requiring attention.

When a user is viewing an AR, MR, or VR presentation rendered on a wearable appliance 206, there is a tendency on the part of the user to focus on virtual elements within the presentation while ignoring physical objects within the user's surrounding environment. Consequently, the use of such systems poses considerable risks of injury by distracting the user's attention from potential physical hazards in the user's proximity. This is a particular concern when such AR/MR/VR systems are used within inherently dangerous spaces such as industrial facilities, which often include rotating equipment, trip hazards, mobile equipment and vehicles, electrical elements, chemical elements, and other hazards. This risk is further increased as a result of visual blind spots created by the wearable appliance itself, which can mask potential hazards from the user's view. Without safety precautions, the use of augmented, mixed, or virtual reality within an industrial environment can compound the traditional safety hazards already faced by factory personnel.

To address these and other issues, one or more embodiments described herein provide an AR/MR/VR system that supports definition and enforcement of a virtual "safety shield" around the wearer of an augmented reality, mixed reality, or virtual reality wearable appliance (or another type of client device). In one or more embodiments, the AR/MR/VR system can leverage room mapping and motion tracking capabilities of the AR/MR/VR equipment to identify and warn of potential safety concerns.

Figure 3:
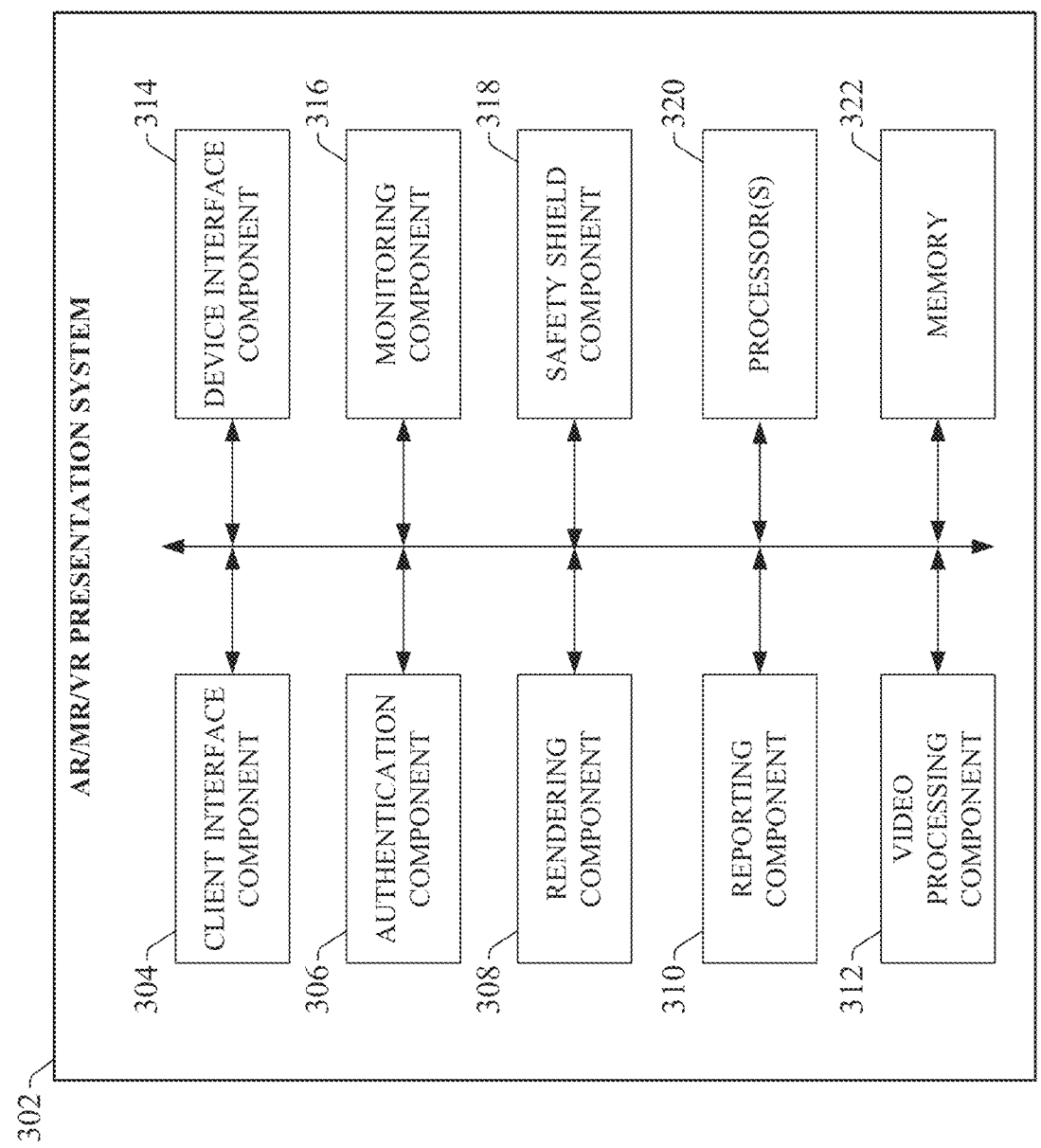
FIG. 3 is a block diagram of an example virtual and augmented reality presentation system.

FIG. 3 is a block diagram of an example AR/MR/VR presentation system 302 according to one or more embodiments of this disclosure. Aspects of the systems, apparatuses, or processes explained in this disclosure can constitute machine-executable components embodied within machine (s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

AR/MR/VR presentation system 302 can include a client interface component 304, an authentication component 306, a rendering component 308, a reporting component 310, a video processing component 312, a device interface component 314, a monitoring component 316, a safety shield component 318, one or more processors 320, and memory 322. In various embodiments, one or more of the client interface component 304, authentication component 306, rendering component 308, reporting component 310, video processing component 312, device interface component 314, monitoring component 316, safety shield component 318, the one or more processors 320, and memory 322 can be electrically and/or communicatively coupled to one another to perform one or more of the functions of the AR/MR/VR presentation system 302. In some embodiments, components 304, 306, 308, 310, 312, 314, 316, and 318 can comprise software instructions stored on memory 322 and executed by processor(s) 320. AR/MR/VR presentation system 302 may also interact with other hardware and/or software components not depicted in FIG. 3. For example, processor(s) 320 may interact with one or more external user interface devices, such as a keyboard, a mouse, a display monitor, a touchscreen, or other such interface devices.

Client interface component 304 can be configured to exchange information between the AR/MR/VR presentation system 302 and a wearable appliance or other client device having authorization to access the system. For example, the client interface component 304 can receive contextual information about a user based on a monitoring of the user's wearable appliance or other client device, device or machine identity information (e.g., information obtained by the wearable appliance from optical codes associated with the device or machine), requests from the wearable appliance to add or remove information from the presentation, commands from the wearable appliance to transition the presentation to a live video feed sourced by a selected video camera, requests from the wearable appliance to invoke a virtual control panel or other virtual or augmented reality presentation, etc. Client interface component 304 can also deliver augmented reality, virtual reality, or mixed reality presentations to the wearable appliance.

Authentication component 306 can be configured to confirm authorization of a user to receive and interact with a virtual control panel or other virtual or augmented reality presentation. For example, authentication component 306 can be configured to cross-reference user identification information received from a wearable appliance with control privilege information defined for the identified user. Authentication component 306 may also determine a defined role associated with the user identification information and grant a level of control privilege commensurate with the user's role. Levels of control privilege controlled by authentication component 306 can include, for example, view-only privileges, full control privileges, limited control privileges whereby a selected subset of virtual control panel functions may be interfaced by the user, or other such access levels.

Rendering component 308 can be configured to retrieve a suitable virtual reality, mixed reality, or augmented reality presentation for rendering on a user's wearable appliance, and modify or enhance the presentation with real-time or historical data retrieved from one or more industrial devices, live or historical video feeds of the plant floor, or other information. In the case of augmented reality presentations delivered to the user's wearable appliance as the user traverses the plant environment, some embodiments of rendering component 308 can generate presentations based on an identity of an industrial device, automation system, control cabinet, or machine received from the wearable appliance, such that available information about devices, machines, or control cabinets within the user's line of sight is displayed on the appliance. The rendering component 308 can also select the AR/MR/VR presentation in accordance with the user's control privileges (determined by the authentication component 306). The selected presentation can then be sent to the wearable appliance the client interface component 304.

Reporting component 310 can be configured to generate report data based on computations performed on subsets of collected industrial data, and present the report data in a suitable format on an AR/MR/VR presentation via the wearable appliance. For example, reporting component 310 can be configured to calculate operating statistics for a device, work cell, machine, or production area based on data collected from industrial devices on the plant floor. The rendering component 308 can then render these statistics on an augmented, mixed, or virtual reality presentation. Video processing component 312 can be configured to process and store video stream data from one or more cameras mounted on the plant floor, such that the video data from each camera is tagged with identification information indicating the location recorded by the video data. In some embodiments, rendering component 308 can, in response gesture or verbal input received from a user's wearable appliance, transition an AR/MR/VR presentation to a live or historical video feed sourced by the stored video data.

Device interface component 314 can be configured to exchange information between the AR/MR/VR presentation system 302 and one or more on-premise industrial devices (e.g., industrial controllers, telemetry devices, motor drives, quality check systems, industrial safety systems, etc.), cameras, or data collection devices (e.g., industrial data historians), located at one or more industrial plant facilities. In some embodiments, device interface component 314 can exchange data with the on-premise devices via the plant networks on which the devices reside. In some embodiments, device interface component 314 can also receive some or all of the plant floor data via a public network such as the Internet. The device interface component 314 can directly access the data generated by these on-premise industrial devices and systems via the one or more public and/or private networks in some embodiments. Alternatively, device interface component 314 can access the data on these on-premise devices via a proxy or gateway device that aggregates the data from multiple industrial devices for migration to the cloud platform via the device interface component.

Monitoring component 316 can be configured to monitor selected subsets of data collected by device interface component 314 according to defined monitoring rules, and to deliver notifications and/or workflow recommendations in response to detecting a maintenance or performance issue based on a result of the monitoring. Monitoring component 316 can work in conjunction with rendering component 308 to deliver suitable notifications and workflows to wearable appliances associated with appropriate plant personnel, such that the workflows are presented as part of an augmented reality presentation to guide personnel through the process of enacting an appropriate countermeasure to the detected issue. In addition to defining the conditions that define an issue requiring notification, the monitoring rules can also define which employees are to be notified in response to each type of detected performance or maintenance issue.

Safety shield component 318 can be configured to leverage spatial mapping data, environment mapping data, and/or motion tracking data generated by wearable appliance 206 to determine when a wearer of appliance 206 is at risk of interfacing or interacting with a hazardous object or area. Safety shield component 318 can be configured to determine when a hazardous object is about to enter within a defined safe distance from the user, and to send a notification to the wearable appliance 206 warning of the hazard in response to the determination. The defined safe distance in all directions from the user defines a three-dimensional space around the user referred to herein as a virtual safety shield. In this way, safety shield component 318 can proactively warn personnel within the plant facility when they are about to physically interact with a hazardous object (e.g., a machine, industrial equipment, a forklift, etc.), or is about to enter into a known hazardous area. In some embodiments, safety shield component 318 can also be configured to communicatively interface with industrial equipment (e.g., via device interface component 314), and to send control outputs to this equipment in response to determining that the equipment is within range of the user's virtual safety shield, indicating that the wearer of appliance 206 is about to dangerously interface with this equipment.

The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

Figure 4:
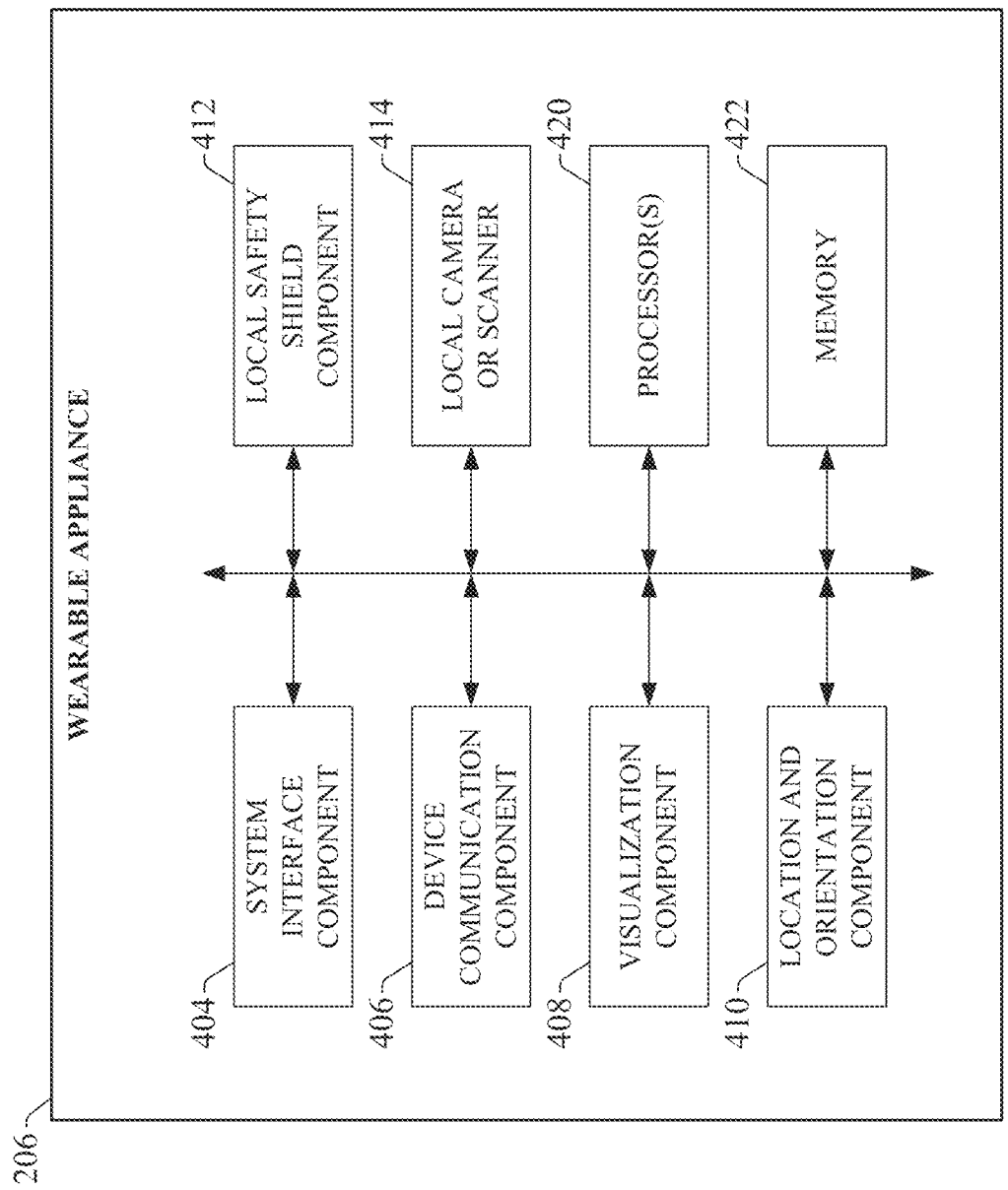
FIG. 4 is a block diagram of an example wearable appliance.

FIG. 4 is a block diagram of an example wearable appliance 206 according to one or more embodiments of this disclosure. Wearable appliance 206 can include a system interface component 404, a device communication component 406, a visualization component 408, a location and orientation component 410, a local safety shield component 412, a local camera or scanner 414, one or more processors 420, and memory 422. In various embodiments, one or more of the system interface component 404, device communication component 406, visualization component 408, location and orientation component 410, local safety shield component 412, local camera or scanner 414, the one or more processors 420, and memory 422 can be electrically and/or communicatively coupled to one another to perform one or more of the functions of the wearable appliance 206. In some embodiments, components 404, 406, 408, 410, 412, and 414 can comprise software instructions stored on memory 422 and executed by processor(s) 420. Wearable appliance 206 may also interact with other hardware and/or software components not depicted in FIG. 4. For example, processor(s) 420 may interact with one or more external user interface devices, such as a keyboard, a mouse, a display monitor, a touchscreen, or other such interface devices.

System interface component 404 can be configured to exchange data over wireless communication channels with AR/MR/VR presentation system 302. Device communication component 406 can be configured to exchange data between the wearable appliance 206 and industrial devices via an industrial network on which the devices reside. In an example implementation for use with CIP networks, the device communication component 406 can support CIP protocol carried by EtherNet/IP. However, embodiments described herein are not limited to these protocols.

Visualization component 408 can be configured to render the virtual reality, augmented reality, mixed reality, or video presentations delivered to the wearable appliance 206 by AR/MR/VR presentation system 302. Example augmented reality presentations can include graphical overlays that are superimposed over a user's field of view of his or her surroundings via a wearable appliance. These graphical overlays can include, but are not limited to, operational or status data indicators (both alphanumerical and icon-based indicators) for an industrial system or device within the user's field of view, indicators that direct a user to a location of an industrial system or device within a plant environment, guidance indicators for assisting a user in diagnosing and addressing an identified problem with an industrial system or device, or other such overlays. Example AR/MR/VR presentations can include both external scaled down views of a factory floor area as well as virtualized first-person views of the plant floor. In some embodiments, visualization component 408 can also render, under the instruction of AR/MR/VR presentation system 302, live or pre-recorded video feeds received from 360-degree cameras (or other types of video or audio capture devices) mounted at selected areas of the plant floor.

Location and orientation component 410 can be configured to determine a location and an orientation of the wearable appliance 206. This information can be sent to the AR/MR/VR presentation system 302 by system interface component 404 so that human operators can be tracked and rendered within a VR presentation, and so that the AR/MR/VR presentation rendered by visualization component 408 reflects the user's current location and/or orientation. This location and orientation information can also be used by the safety shield component 318 in connection with identifying risks of interaction between the wearer of appliance 206 and a hazardous object or piece of equipment.

Local safety shield component 412 can be configured to perform one or more of the functions described above as being performed by safety shield component 318. In this regard, safety shield functionality can be implemented on one or both of the AR/MR/VR system 402 or the wearable appliance itself 206. In either case, the safety shield component 318 or local safety shield component 412 can determine potential intersections between the wearer of wearable appliance 206 and hazardous equipment or objects based on one or more of the following: Location and orientation data generated by the wearable appliance 206 (e.g., based on GPS data or triangulation data), environment mapping data generated by the wearable appliance 202 (e.g., using a depth camera and CPU processing), and motion tracking data (e.g., using an inertial measurement unit and CPU processing). In some embodiments, rather than using environment mapping, geofences can be used to determine virtual geographic boundaries. Local camera or scanner 414 can be configured to collect information about the wearer's immediate surroundings that can be leveraged by local safety shield component 414 to identify potential interactions between the wearer and hazardous equipment or objects. In various embodiments, local camera or scanner 414 may be a time-of-flight camera or another type of depth camera, an RFID scanner, or another type of scanning component capable of collecting information about objects or surfaces within a scanning range of the wearer.

The one or more processors 420 can perform one or more of the functions described herein with reference to the systems and/or methods disclosed. Memory 422 can be a computer-readable storage medium storing computer-executable instructions and/or information for performing the functions described herein with reference to the systems and/or methods disclosed.

Figure 5:
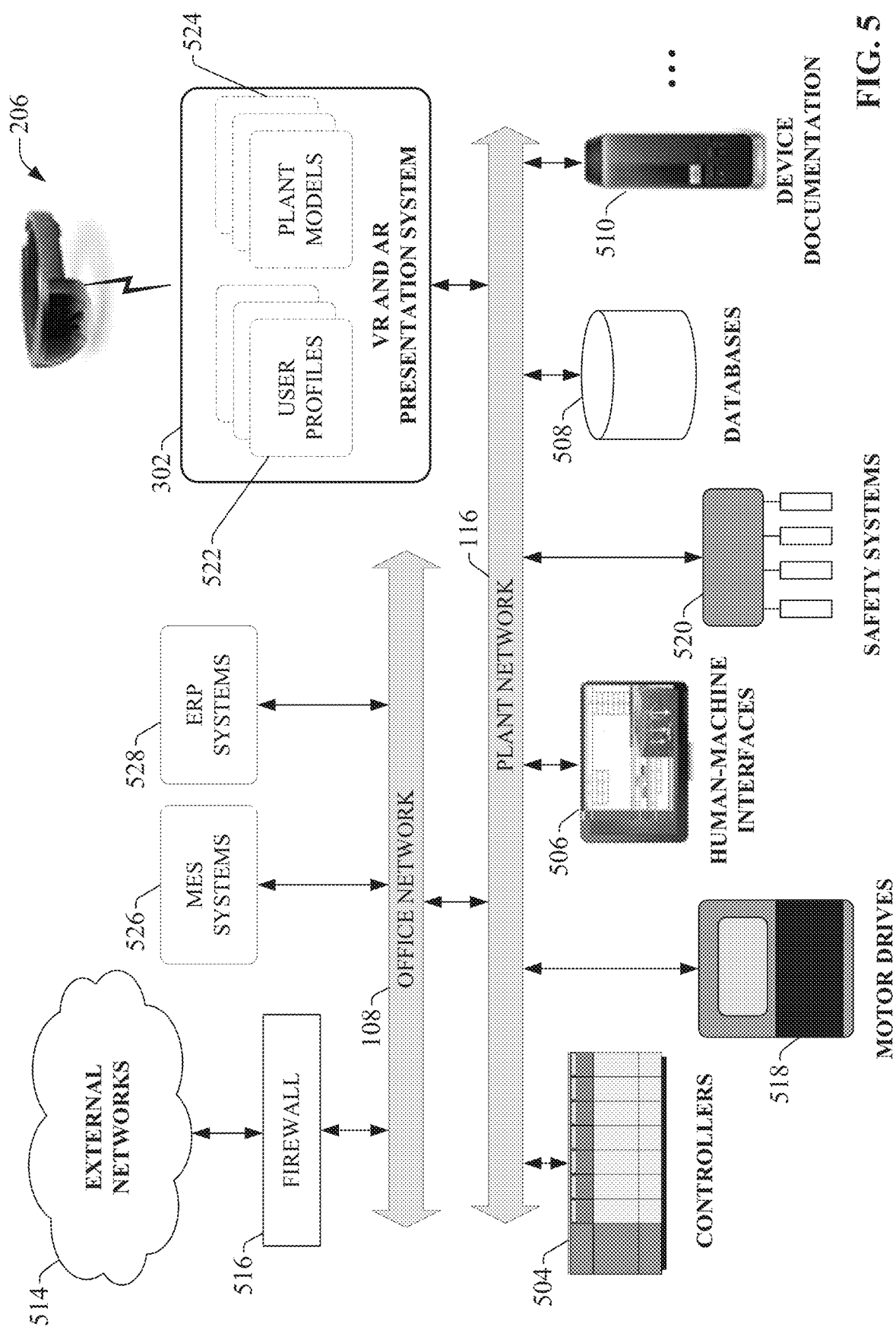
FIG. 5 is a block diagram of a generalized example architecture including an AR/MR/VR presentation system that serves as a content provide for augmented and virtual reality presentations of an industrial facility.

FIG. 5 is a block diagram of a generalized example architecture including a AR/MR/VR presentation system 302 that renders augmented and virtual reality presentations of an industrial facility. The example industrial environment depicted in FIG. 5 includes one or more industrial controllers 504, HMIs 506, motor drives 518, industrial safety systems 520, databases 508 (e.g., data historians, employee databases, inventory databases, etc.), and device documentation repositories 510. The industrial environment may also include other sources of industrial data not depicted in FIG. 5, including but not limited to quality systems (e.g., vision systems or other qualify verification systems), telemetry devices, presence sensors (e.g., photo detectors, optical scanners, proximity switches, etc.), video cameras, and other devices or sub-systems. In an example environment, these industrial devices and systems can reside on a plant (operational technology, or OT) network 116. In some scenarios, the industrial devices may be distributed across multiple plant networks 116 within the plant facility. The industrial environment may also include devices and systems residing on an office (information technology, or IT) network 108, including but not limited to manufacturing execution systems (MES) 526, enterprise resource planning (ERP) systems 528, business intelligence systems, business-level analytic systems, or other such assets. One or both of office network 108 or plant network 116 may also have access to external networks 514 such as the Internet (e.g., via firewall device 516).

AR/MR/VR presentation system 302—which can reside on plant network 116 in the example architecture depicted in FIG. 5, but which may also reside on office network 108, on an external network, on a web server, or on a cloud platform as a cloud-based service provider—collects data from the diverse set of industrial devices via network 116. In some configurations, the presentation system 302 can also collect selected items of plant data from one or more devices or systems on office network 108, including but not limited to the MES system 526, ERP system 528, business intelligence systems, or other such assets. Presentation system 302 formats the data for rendering in virtual and augmented reality presentations. One or more plant models 524 stored on the presentation system 302 can define three-dimensional views of areas within an industrial facility (e.g., production lines or work areas), and presentation system 302 can generate three-dimensional virtual or augmented reality presentations of the areas—including machines, control cabinets, conveyors, industrial devices, etc.—based on the plant models 524. The presentation system 302 can also superimpose selected subsets of the collected industrial data on the virtual or augmented reality presentations on or near graphical representations of the industrial asset (e.g., machine, control cabinet, industrial controller, etc.) to which the data relates. Other interactive features of the virtual and augmented reality presentations will be described in more detail herein.

The augmented, mixed, or augmented reality presentations can also be customized in accordance with a defined role of the wearer of appliance 206, as specified in user profiles 522 defined for each user of the system. Example user roles that can determine how AR, MR, or VR data is presented to a user can include, but are not limited to, line operators, maintenance personnel, plant managers, plant engineers, or other roles.

Presentation system 302 can deliver these presentations to a wearable appliance 206 worn by a user, who may be at the plant facility or at a remote location relative to the facility. In the case of remote access from outside the facility, presentation system 302 can be made securely accessible by authorized wearable appliances 206 via an outside network such as the Internet. In some embodiments, presentation system 302 can be implemented on a web server, allowing wearable appliance 206 to invoke AR/MR/VR presentations via an Internet connection. The presentation system 302 may also be implemented on a networked local server accessible by the wearable appliance 206 via a wireless network connection. In yet another scenario, presentation system 302 may be implemented on a cloud platform, where the search system executes as a cloud-based service.

Figure 6:
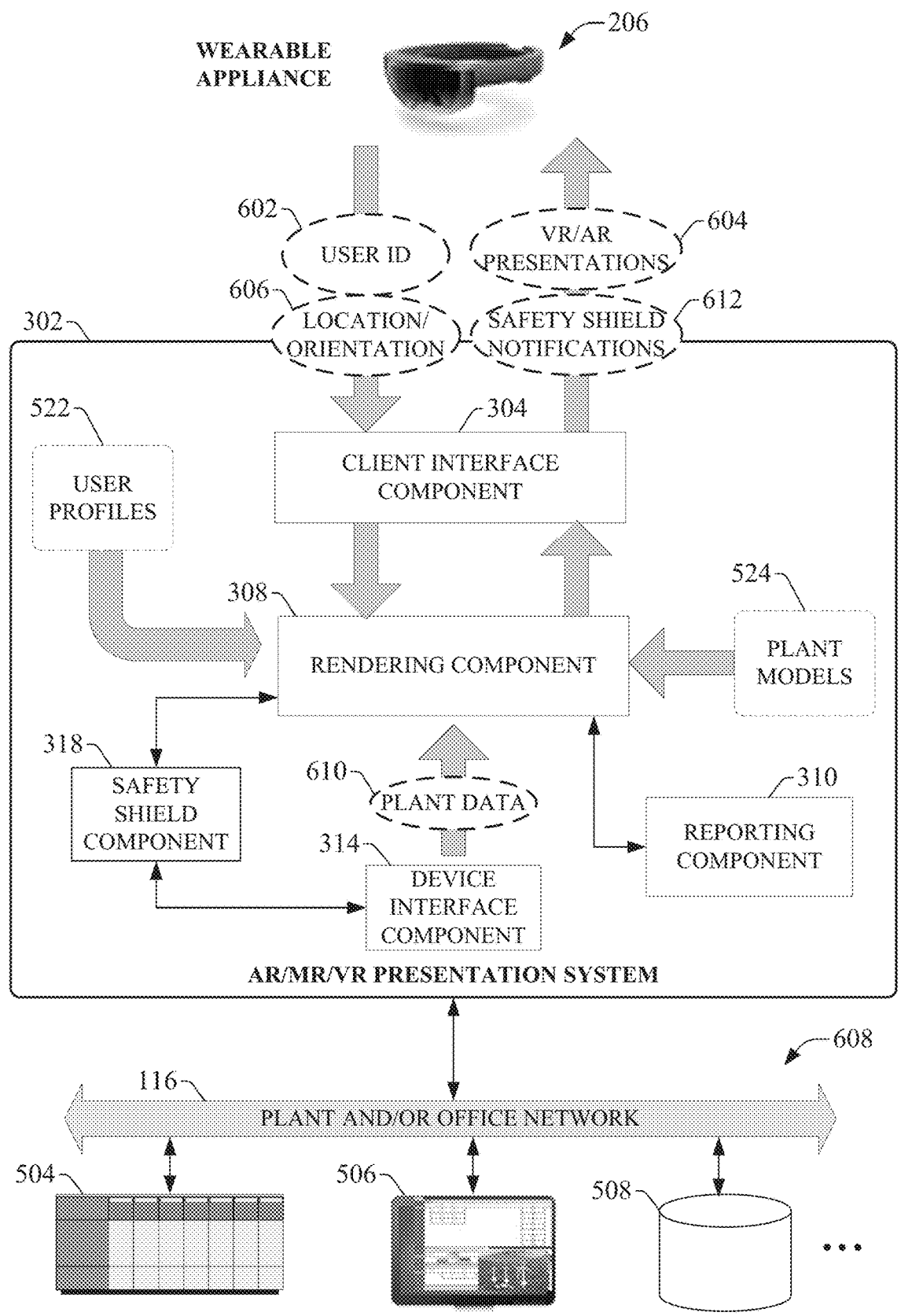
FIG. 6 is a block diagram illustrating components of the AR/MR/VR presentation system in more detail.

FIG. 6 is a block diagram illustrating components of the AR/MR/VR presentation system 302 in more detail. AR/MR/VR presentation system 302 includes a device interface component 314 that collects live and historical industrial data from industrial devices and systems 608 distributed across an industrial environment. In some embodiments, device interface component 314 can be configured to retrieve selected data items from the industrial devices and systems 608 via networks 116 or 108 in accordance with defined monitoring rules that specify the data items to be collected. The data items to be collected can be defined in terms of data tag names that identify data tags on industrial controllers, HMIs, data historians, or other industrial devices; name and location information for data files to be collected (e.g., work order data files, device documentation files, inventory files, etc.), or other such data identifiers. The collected data items can include telemetry and status information relating to operation of the devices or their associated industrial automation systems, as well as configuration information for the industrial devices (e.g., motor drive parameters, industrial controller communication settings, I/O modules installed on each industrial controller, etc.). From the office network 108 or external networks 514, the collected data can include, but is not limited to, work management information, production line scheduling information, operator work schedule information, product or material inventory information, etc.

For some industrial devices, the device configuration or program development application used to configure and/or program the device can also be used to define which data items on the device are to be collected by the AR/MR/VR presentation system 302. For example, the program development application used to define data tags on an industrial controller—as well as to program the controller and configure the controller's I/O and communication settings—can include an option to flag data tags defined on the controller for collection and rendering by the AR/MR/VR presentation system 302. In such embodiments, the program development application may be integrated with a virtual/augmented reality configuration tool, so that both the controller and aspects of the controller's AR/MR/VR visualization can be configured together using the same configuration tool. For example, for a given data tag defined on the industrial controller, the program development application can allow the user to set the tag to be a value that is to be collected by the AR/MR/VR presentation system, as well as to define any associations the tag may have outside the scope of the controller (e.g., by identifying any production areas, machines, industrial processes, or automation systems the data tag is associated with). The user may also define the visualization privileges associated with the tag via the program development application, which can be used by rendering component 308 to determine which user roles are permitted to view data associated with the data tag. Based on such configuration information, rendering component 308 can render selected items of data defined on the industrial controller (or other industrial devices) in association with the virtualized production area, machines, processes, or systems with which the data tag has been assigned, and in accordance with the defined role-based visualization privileges.

In some embodiments, the device interface component 314 can also be configured to discover data items residing on industrial devices distributed across the environment. In some embodiments, device interface component 314 can discover available data items by deploying discovery agents on network 116 and/or 108. These agents—which can be programs or bots—can traverse networks 116 and/or 108 and identify devices in use throughout the plant, as well as the data items or tags, applications, and configuration information associated with those devices. Since a given industrial environment typically comprises a heterogeneous collection of devices of different types and vendors, and the data made available by these devices may comprise many different data types (e.g., controller tags, HMI tags, alarms, notifications, events, etc.), some embodiments of device interface component 314 can manage and deploy device-specific or platform-specific agents configured to extract and analyze information from specific types of devices or data platforms (e.g., controllers, HMIs, etc.). Some device-specific agents can be configured to locate application project files stored on particular device types (e.g., configuration and/or program files on an industrial controller, screen configuration files on an HMI, etc.), and extract relevant information about the devices based on analysis of data contained in these project files. By leveraging device-specific and platform-specific agents, embodiments of device interface component 314 can discover and retrieve data conforming to many different formats and platforms.

In order to unify this disparate heterogeneous data under a common platform for collective searching, device interface component 314 (or the device-specific agents) can transform the collected data to a format understandable by the rendering component 308 to yield normalized plant data 610.

In some embodiments, device interface component 314 can also discover and record relationships—both explicit and inferred—between data items discovered on the industrial devices and systems 608. In such embodiments, the device interface component 314 may record these relationships by tagging discovered data items with classification tags and building a search index based on these classification tags, such that related data items share common tags. The classification tags may identify, for example, a common machine or automation system with which the devices are associated, a production area in which the devices reside, a control cabinet identifier, or other such classification tags. In some scenarios, these classification tags may be explicitly defined by a system developer such that the device interface component 314 determines which predefined tags should be applied to newly discovered data items. The device interface component 314 may also auto-generate classification tags for a given data item based on contextual information, including but not limited to rung comments associated with a controller tag, learned interdependencies between a newly discovered data item and a previously discovered data item (e.g., learn that a pump named Pump5 is associated with a tank named Tank1, and therefore tag Pump5 as being associated with Tank1, or tag both Tank1 and Pump5 according to the larger system in which they operate), or other discovered contextual information. The device interface component 314 can define associations between similarly tagged data items regardless of the platform in which they were discovered. For example, the device interface component 314 can associate common or related data items discovered, respectively, in an industrial controller, an HMI, a data historian, and ERP or MES system, a business intelligence system, etc.

Using some or all of these techniques, device interface component 314 can discover and collect operational, status, and configuration data relating to operation and health of industrial automation systems across a facility, as well as higher-level business data from devices on an office or IT network. This collected plant data 610 can be stored in memory associated with the AR/MR/VR presentation system 302 (e.g., memory 322) and used by rendering component 308 to populate virtual and augmented reality presentations with live or historical data.

Although FIG. 6 depicts the components of presentation system 302 as residing on a common system device, in some embodiments one or more of the components of the system 302 can reside on different physical devices.

Wearable appliance 206 can interface with AR/MR/VR presentation system 302 via client interface component 304, which may comprise a wired or wireless network interface, a near-field communication interface, or other such device interface suitable for the particular platform on which the presentation system 302 is implemented. In some embodiments, client interface component 304 may be configured to verify an authorization of the wearable appliance 206 to access the presentation system 302 prior to allowing AR/MR/VR presentations to be delivered to the wearable appliance 206. Client interface component 304 may authenticate the wearable appliance 206 or its owner by verifying user identification information 602 received from the appliance 206 using password verification, biometric identification (e.g., retinal scan information collected from the user by the wearable appliance 206 and submitted to the client interface component 304), cross-referencing an identifier of the wearable appliance 206 with a set of known authorized devices, or other such verification techniques.

Rendering component 308 is configured to generate virtual and augmented reality presentation data 604 to wearable appliance 206 for delivery by client interface component 304. Presentation data 604, when received and executed by wearable appliance 206, renders an interactive three-dimensional virtual reality presentation of an industrial area on the wearable appliance's display.

The location and orientation component 410 of wearable appliance 206 can be configured to determine a current geographical location of the appliance 206. In some embodiments, location and orientation component 410 can leverage global positioning system (GPS) technology to determine the user's absolute location, or may be configured to exchange data with positioning sensors located within the plant facility in order to determine the user's relative location within the plant. Location and orientation component 410 can also include orientation sensing components that measure the wearable appliance's current orientation in terms of the direction of the appliance's line of sight, the angle of the appliance relative to horizontal, etc. Other types of sensors or algorithms can be supported by embodiments of the wearable appliance 206 for determining a wearer's current location and orientation, including but not limited to inertial measurement units (IMUs) or visual-inertial odometry (VIO). The wearable appliance's system interface component 404 can report the location and orientation information generated by location and orientation component 410 to the AR/MR/VR presentation system 302 as location and orientation data 606.

Location and orientation data 606 is used by AR/MR/VR presentation system 302 to control the point of view of the AR/MR/VR presentation 604 rendered on appliance by client interface component 304. For example, a user may be viewing an AR presentation of an industrial area via the wearable appliance 206. Rendering component 308 receives location and orientation data 606 generated by the user's wearable appliance, and renders the presentation on the wearable appliance 206 in accordance with the user's current location and orientation as indicated by location and orientation data 606. In particular, the direction and angle of the viewing perspective of the AR presentation is a function of the user's location and orientation.

Safety shield component 318 is configured to define and track a virtual safety shield associated with a wearer of appliance 206 based on the location and orientation data 606, and to continuously compare this virtual safety shield definition with the plant models 524 and/or plant data 610 to determine whether the wearer is at risk of accidentally initiating a nuisance trip of a safety system or dangerously interacting with hazardous equipment. In response to determining that the user is at risk of interfacing with a safety system or hazardous machinery, the safety shield component 318 can instruct client interface component 304 to issue a safety shield notification 612 to the wearer's appliance 206 or another client device associated with the wearer. This virtual safety shield functionality will be described in more detail below.

Figure 7:
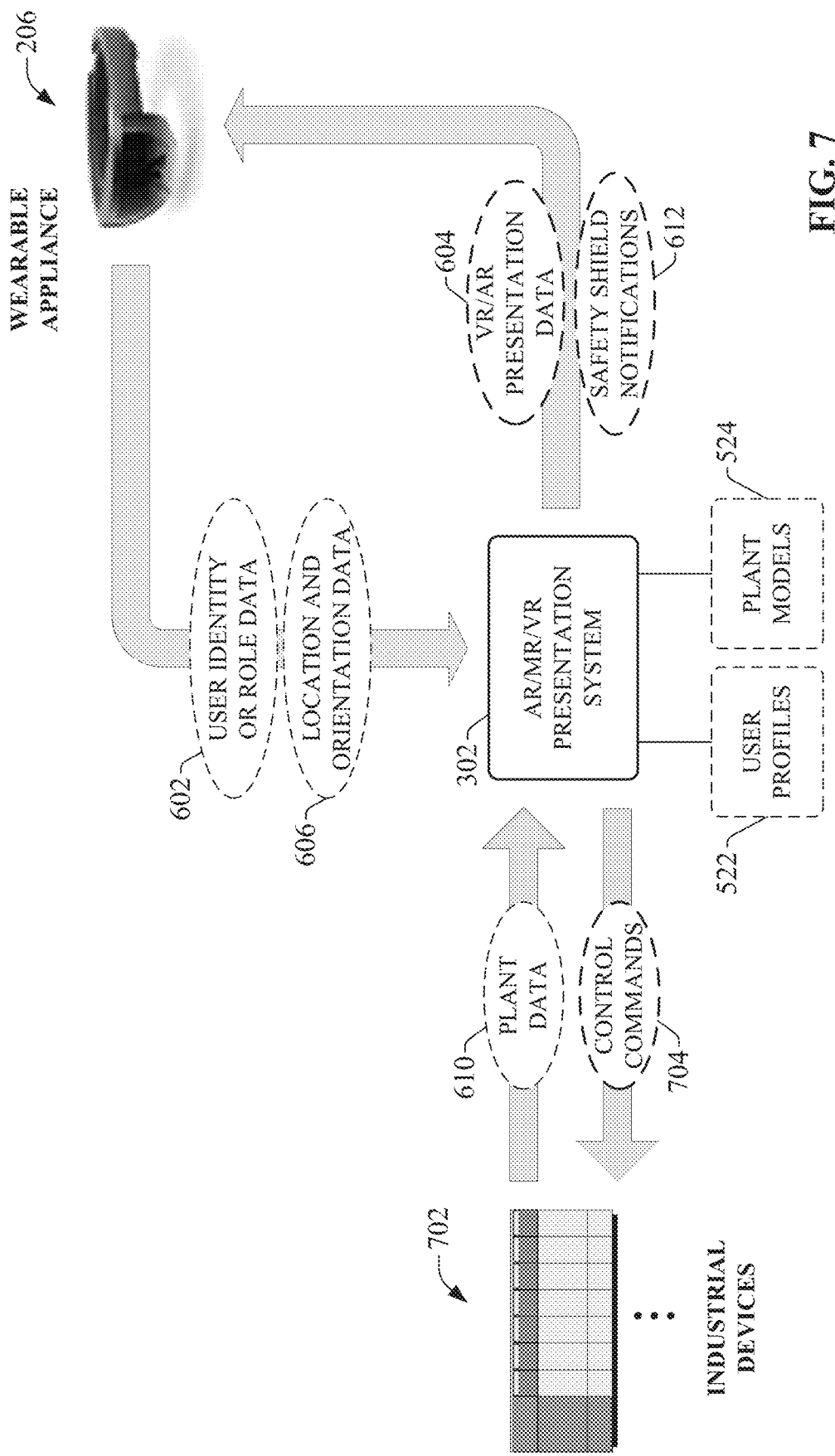
FIG. 7 is a diagram illustrating data inputs leveraged by AR/MR/VR presentation system to generate AR/MR/VR presentations and to issue virtual safety shield notifications an associated control commands

The AR/MR/VR presentation is generated based on a combination of diverse information received and processed by rendering component 308. FIG. 7 is a diagram illustrating data inputs leveraged by AR/MR/VR presentation system 302 to generate AR/MR/VR presentations. As noted above, presentation system 302 collects plant data 610 from industrial devices 702 across the plant environment. Presentation system 302 also maintains one or more plant models 524 that define a visual representation of the physical layout of the area represented by an AR/MR/VR presentation. For example, a plant model for a given industrial area (e.g., a production area, a workcell, an assembly line, etc.) can define graphical representations of the industrial assets—including machines, conveyors, control cabinets, and/or industrial devices—located within that area, as well as the physical relationships between these industrial assets. For each industrial asset, the plant model can define locations (e.g., in terms of global coordinates or plant coordinates) and physical dimensions and colors for the asset, as well as any animation supported by the graphical representation (e.g., color change animations, position animations that reflect movement of the asset, etc.). The plant models 524 also define the physical relationships between the industrial assets, including relative positions and orientations of the assets on the plant floor, conduit or plumbing that runs between the assets, and other physical definitions.

A rendering engine supported by rendering component 308 is configured to generate an interactive AR/MR/VR presentation of the industrial area based on the industrial asset rendering definitions specified in the plant models. Rendering component 308 populates this AR/MR/VR presentation with selected subsets of collected plant data 610 (as well as production or operational statistics calculated by reporting component 310 based on subsets of the plant data 610), and client interface component 304 delivers the resulting aggregate AR/MR/VR presentation to wearable appliance 206 as AR/MR/VR presentation data 604. Rendering component 308 can generate the presentation such that items of the plant data 610 are overlaid on or near graphical representations of the industrial assets to which the items of data relate.

Figure 8A:
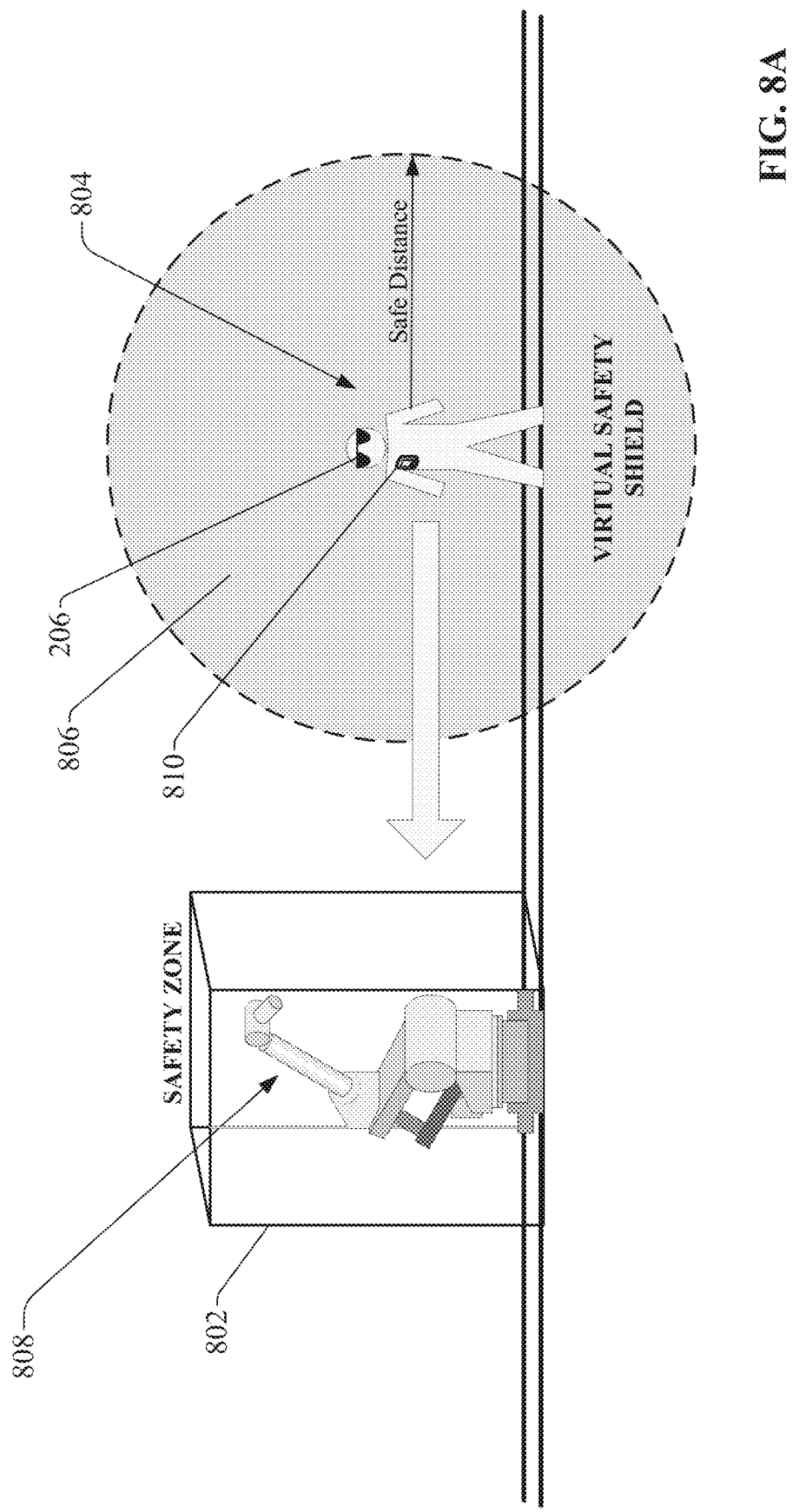
FIG. 8A is a diagram illustrating an implementation for preventing nuisance trips of an industrial safety system caused by a person entering a safety zone of an industrial facility.

The virtual safety shield functionality described above can be used to monitor a wearer of appliance 206 relative to a protected safety zone in order to prevent nuisance trips of the zone's safety system without sacrificing operator safety. FIG. 8A is a diagram illustrating an implementation for preventing nuisance trips of an industrial safety system caused by a person 804 entering or passing a safety zone 802 of an industrial facility. In an example scenario, a virtual safety zone 802 may be defined around a hazardous industrial machine 808 or other dangerous equipment surrounded by protective guarding to prevent personnel from entering the dangerous area while the machine 808 is operating. In some cases, perimeter guarding is erected around the machine 808, and an associated industrial safety system—comprising a safety relay or controller and associated safety input devices (e.g., safety mats, light curtains, three-dimensional optical safety sensors, etc.)—monitors entry into the hazardous area. The safety system causes the protected machine 808 to enter a safe state—e.g., a de-energized state, or a stopped or slow running mode—when a safety input device is tripped, which indicates the presence of a person entering the protected area. The virtual safety zone 802 can be a three-dimensional volume defined to encompass both the machine 808 and its associated safety system. In other scenarios, no protective guarding is used, and instead the safety zone 802 is defined and enforced solely by optical safety sensors—e.g., three-dimensional optical safety sensors, laser scanners, geo-fences, etc.—that monitor the area surrounding the machine 808. Such optical safety sensors can be configured to enforce defined boundaries of the safety zone 802 by monitoring the space surrounding the hazardous machine 808 and placing the machine 808 in a safe state (e.g., a de-energized, stopped, or slow running mode) in response to detecting that a person has moved within the defined boundaries of the safety zone 802.

Accidental tripping of safety input devices (or accidental momentary crossing of monitored safe boundaries in the case of optically monitored safety zones) by a person who is not attempting to enter the hazardous area surrounding the machine 808 can result in nuisance stops of the protected equipment, necessitating a restart of the equipment. This can impact productivity by increasing total machine downtime and diminish the trust and effectiveness of the safety system.

To address this issue, the AR/MR/VR presentation system 302, or the wearable appliance acting independently of the AR/MR/VR presentation system 302, can be configured to deliver a warning—in the form of a safety shield notification 612—to the person 804 in response to determining that the person 804 is at risk of entering a protected hazardous area and tripping a safety input device (e.g., a light curtain, a safety mat, a geo-fence system, an optical safety scanner, etc.). To this end, safety shield component 318 (or local safety shield component 412) can define and enforce a safe distance from the person 804, referred to as a virtual safety shield 806. This safe distance is defined in all directions relative to the current location of the user's wearable appliance 206, yielding a three-dimensional virtual safety shield 806 that surrounds person 804 and tracks with the wearer's changing location as the wearer moves throughout the plant. Although the example illustrated in FIG. 8A depicts a spherical virtual safety shield 806 in which the safe distance is equal in all directions, some embodiments of safety shield component 318 can allow virtual safety shields of irregular three-dimensional shapes to be defined (e.g., regular geometric volumes or irregular three-dimensional shapes).

In some embodiments, a virtual three-dimensional safety zone 802 can also be defined around the hazardous area. As will be discussed in more detail below, safety zone 802 can be established as a static safety zone (e.g., using geo-fences or point cloud capture, or as a three-dimensional volume defined in the plant models 524), or may be dynamically generated by the wearable appliance 206 based on information about the wearer's surroundings obtained by local camera or scanner 414.

In an example embodiment, AR/MR/VR presentation system 302 and/or wearable appliance 206 can use the defined virtual safety shield 806 to make the determination as to whether the person 804 is at risk of interacting with the safety zone 802. In various embodiments, this determination can be made by the AR/MR/VR presentation system 302 by comparing absolute coordinates of the virtual safety shield and the virtual safety zone, or may be determined locally by the wearable appliance—independently of the AR/MR/VR presentation system 302—based on local scanning and processing. In an example embodiment in which the AR/MR/VR presentation system 302 monitors for intrusions, safety shield component 318 can monitor the location and orientation data 606 received from the user's wearable appliance 206, and continuously update the location of the virtual safety shield 806 relative to the wearer's current location. In particular, safety shield component 318 continuously defines the virtual safety shield 806 as a volume centered on or otherwise surrounding the user's current location (as defined by location and orientation data 606) and bounded by the locus of points that are the defined safe distance from the wearer's current location. Safety shield component 318 can continuously compare the location and spatial boundaries of the virtual safety shield 806 with the plant models 524, which define the locations and physical dimensions of industrial assets within the plant (including hazardous machine), as well as defined safety zones 802 surrounding the hazardous area. The defined safety zones 802 may correspond to spaces monitored by geo-fences, optical safety scanners, or other such safety monitoring devices.

In response to determining, based on correlation between the location and dimensions of the virtual safety shield 806 and the defined locations and dimensions of the defined safety zones 802, that a portion of the space defined by the virtual safety shield 806 overlaps with a portion of the space defined by the safety zone 802, safety shield component 318 (or local safety shield component 412) infers that the person 804 is about to enter (or pass near) the safety zone 802, and initiates delivery of a safety shield notification 612 to the user's wearable appliance 206. Safety shield notification 612 can conform to any suitable format, including but not limited to a visual or audible indication rendered on wearable appliance 206 (e.g., as part of an AR/MR/VR presentation), a signal that triggers a vibration component of wearable appliance 206, or other such notification. Since the safety shield notification 612 is triggered when the user is still separated from the hazardous area (and any associated safety input devices) by a distance defined by the bounds of the virtual safety shield 806 and the virtual safety zone 802, the notification 612 can provide advanced warning to the wearer that he or she is about to enter the safety zone 802 (e.g., that the user is about to enter a space monitored by geo-fences or an optical safety scanner), affording the wearer an opportunity to alter his or her path to avoid the safety zone 802 and mitigate possible accidental tripping of a safety input device. If the person 804 continues toward the safety zone 802 notwithstanding the warning, the safety system associated with the hazardous machine 808 within the safety zone 802 will detect the person 804 and place the protected equipment in its safe state.

Figure 9:
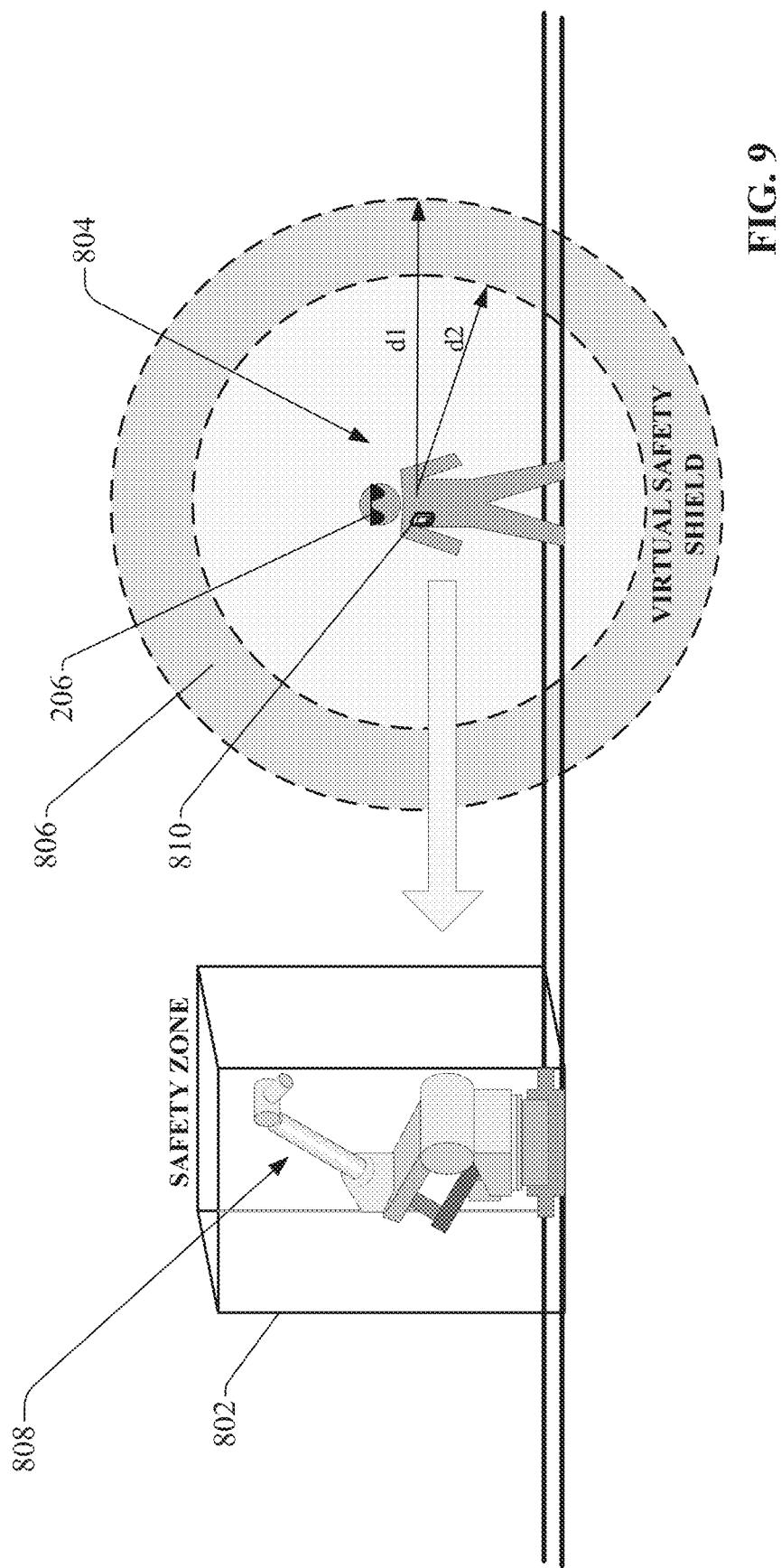
FIG. 9 is a diagram illustrating an example tiered virtual safety shield.

In some such embodiments, the warning system can implement an intermediate step after the warning is issued to place the machine 808 located within the safety zone 802 into an intermediately safe state (e.g., a reduced speed mode) if the person 804 continues moving toward the safety zone 802 after the initial warning is issued but before a safety input device is tripped. If the person 804 continues moving toward the safety zone 802 and trips a safety input device, the machinery will be placed in a fully safe state (e.g., a stopped mode or a deenergized state). In an example implementation, the safety shield component 318 may define two different safe distances, resulting in a tiered virtual safety shield 806. FIG. 9 is a diagram illustrating an example tiered virtual safety shield 806. In this example, two safe distances—a longer distance d1 and a shorter distance d2—are defined by the safety shield component 318, resulting in a virtual safety shield 806 comprising two concentric spheres. If the safety shield component 318 determines that a boundary of the safety zone 802 is within the first distance d1 relative to the wearer but outside the second distance d2, the system 302 issues a notification 612 to the client's wearable appliance 206 or other client device. If the safety zone boundary is within the second distance d2—a distance smaller than the first distance d1 but which still places the user some distance away from the safety zone 802—the system 302 may place the machine 808 in a slow operating state or another less dangerous operating mode. Any number of safety shield tiers may be defined in this manner without departing from the scope of one or more embodiments of this disclosure.

In some embodiments, safety shield component 318 can be configured to dynamically alter the size of the virtual safety shield 806 based on the measured velocity or acceleration of the person's travel. For example, if the user's velocity (as determined by the rate of change of the location and orientation data 606) is within a range corresponding to walking velocity, safety shield component 318 can set the safe distance of the virtual safety shield 806 to be a first distance. If the user's velocity is determined to increase to a range corresponding to a running velocity, safety shield component 318 can increase the safe distance of the virtual safety shield 806, thereby increasing the volume of the virtual safety shield 806. In this way, when the user is traveling at faster speeds, safety shield notifications 612 are delivered to the wearable appliance 206 when the user is at a farther distance from the safety zone 802, thereby allowing for longer reaction distances associated with faster velocities. In some embodiments, the dynamic changes in size of the virtual safety shield 806 can also be based on the user's acceleration or trajectory.

In scenarios in which hazardous machinery (either stationary or mobile) is not protected by physical guarding or a safety zone 802, the virtual safety shield approach can also be used to send control commands 704 (see FIG. 7) to one or more industrial devices 702 to place the machinery in a safe state in response to determining that a person's virtual safety shield 806 overlaps with the hazardous machinery, indicating that the user is at risk of dangerously interacting with the machine. As in examples described above, safety shield component 318 continuously compares the user's location and orientation data 606 with the plant models 524 to determine whether known boundaries of a dangerous machine (as recorded in the plant models 524) overlap with any portion of person's virtual safety shield 806. That is, the safety shield component 318 determines whether a boundary of the dangerous machine falls within the defined safe distance from the person 804, where the safe distance is the defined boundary of the virtual safety shield 806. In response to determining that a portion of the hazardous machine intrudes within the boundary of the virtual safety shield 806, safety shield component 318 can instruct device interface component 314 to send a control command 714 to an industrial device 702 (e.g., an industrial controller, a robot controller, a motor drive, etc.) that controls the hazardous machine to place the machine in a safe state (e.g., a slow operating mode, a stopped mode, and idle mode, etc.). In some implementations, the control command 714 may be an instruction to open a power relay to disconnect power from the machine, thereby de-energizing the machine before the wearer of appliance 206 dangerously interfaces with the machine.

As noted above, as an alternative to virtual safety shields 806 that are defined and tracked remotely by AR/MR/VR presentation system 302, some embodiments may implement the virtual safety shield 806 locally using local area scanning. For example, an area scanner or beacon using technology such as time-of-flight detection or another scanning technology can be carried by the person 804 and used to identify when the person 804 is about to enter the safety zone 802. In an example implementation, an area scanner 810 can be carried by the person 804, creating a virtual safety shield 806 comprising a scanned area around the person 804 that encompasses a calibrated three-dimensional range from the person's current location. This locally scanned virtual safety shield 806 may also be created by the local camera or scanner 414 incorporated in the wearable appliance 206 or area scanner 810 worn by the user in some embodiments. Area scanner 810 may comprise components similar to those described above in connection with FIG. 4 for the wearable appliance, but may omit the system interference component 404 since the area scanner 810 operates independently of the AR/MR/VR presentation system 302. Area scanner 810 may also omit the visualization component 408 for embodiments in which notifications are not delivered visually.

As the person 804 approaches the safety zone 802, if the scanning device (the area scanner 810 or the local camera or scanner 414) determines that the scanned area of the virtual safety shield 806 overlaps with the safety zone 802 (that is, a portion of the safety zone 802 is detected within the virtual safety shield 806), the area scanner 810, wearable appliance 206, or an associated notification system can generate a warning indicating that the person 804 is about to enter a safety zone 802. The detection range of the area scanner 810 or local camera/scanner 414 is such that the person 804 will be notified before any of the machine's safety input devices are tripped. In response to the issued warning, the person 804 may choose to deviate from his or her current trajectory toward the safety zone 802, mitigating a potential nuisance trip of a safety input device. These embodiments—whereby the virtual safety shield 806 is generated and monitored locally by a scanner, wearable appliance, or safety equipment carried by the user—can dynamically monitor for potential hazardous interactions with a safety zone 802 without the need to reference a defined plant model 524.

In various embodiments, the area scanner 810 can be embodied inside or on safety equipment worn by the user, such as a hard hat, a bump cap, safety glasses, safety gloves, arc flash protective clothing, safety shoes, earplugs or other such safety equipment. Technologies used to create the scanned virtual safety shield 806 can include, but are not limited to, radio frequency identification (RFID), wireless networking, near field (e.g. Bluetooth or another near field technology), cellular, GPS-based tracking (e.g., satellite GPS or local in-plant GPS), time-of-flight or another optical depth measurement technology, inertia measurement (e.g., an inertia measurement unit), a red-green-blue (RGB) camera, stereoscope cameras, radio detection and ranging (RADAR), light detection and ranging (LIDAR), or other such technologies.

In some embodiments, the AR/MR/VR presentation system 302, wearable appliance 206, or area scanner 810 can generate multi-level warnings, such that the urgency of the warning increases as the person 804 moves closer to the safety zone 802 after initial overlap between the virtual safety shield 806 and the safety zone 802. For example, the initial warning may be a low audible warning, which escalates to a louder warning as the user continues moving toward the safety zone 802. Higher warning levels may add combinations of both audio and visual warnings (e.g., lights) if the person 804 continues moving toward the safety zone 802. The level of warning presented may be a function of the hazardous machine's depth of intrusion into the virtual safety shield or scanned area 806.

Figure 10:
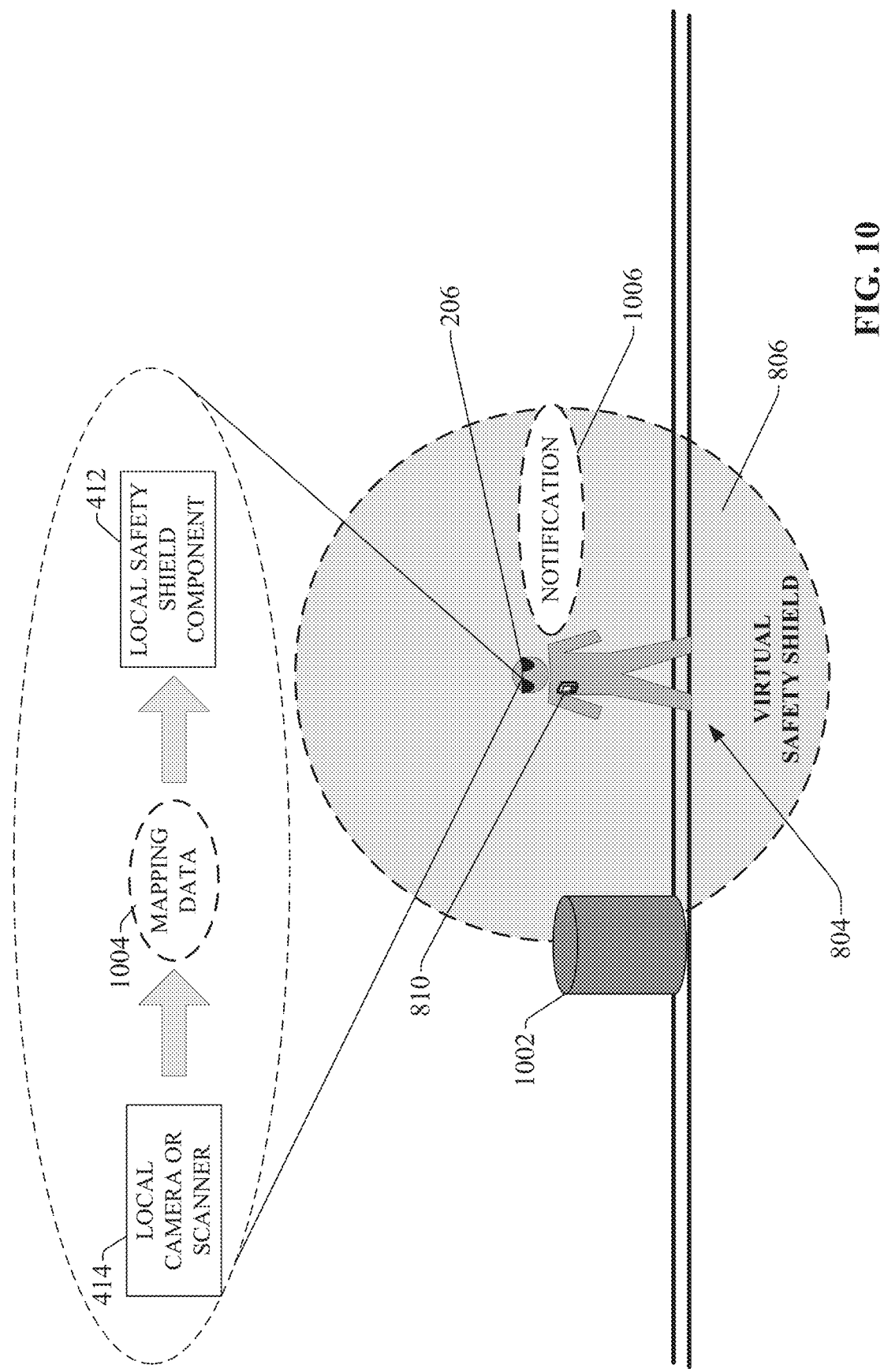
FIG. 10 is a diagram illustrating detection and notification of an obstacle using local scanning techniques.

The virtual safety shield approach can also be used to deliver notifications of potential collisions with other types of obstructions, including but not limited to floor-level tripping hazards (e.g., cables, toolboxes, etc.), head-level obstructions (e.g., low ceilings, girders, conduit, plumbing, etc.), or walls. Detection of such obstructions can be performed entirely locally by the wearable appliance 206 or by the area scanner 810 carried by the person 806. FIG. 10 is a diagram illustrating detection and notification of an obstacle 1002 using local scanning techniques. In some embodiments, the local camera or scanner 414 of wearable appliance 206, or an equivalent component of area scanner 810, can be configured to continuously scan the person's local environment using room mapping, spatial mapping, or environmental mapping techniques, and dynamically generate mapping data 1004 representing detected surfaces in proximity of the person 806. In various embodiments, this scanning can be performed using any of the scanning technologies described above (e.g., RFID, time-of-flight, wireless networking, near field, etc.).

The mapping data 1004 represents a three-dimensional topology of the surfaces and objects within a scanning range of the person 804. Local camera or scanning component 414 (if the wearable appliance 206 is used) or area scanner 810 can continuously update this mapping data 1004 as the user moves through the plant environment, and local safety shield component 412 can correlate this dynamically generated mapping data 1004 with the user's local virtual safety shield, as defined by the user's pose and trajectory, to determine whether there is a risk that the user will hazardously interact with a detected surface or obstruction (e.g., obstruction 1002). For example, the local safety shield component 412 may determine, based on analysis of the mapping data 1004, that a head-level or foot-level obstruction (e.g., a girder, a length of conduit, cabling, etc.) or another type of obstacle (e.g., a wall, a barrel, etc.) is near the wearer and that the wearer's current trajectory and speed puts the wearer at risk of a collision with the detected obstacle. This determination can be based in part on the coordinates of the detected obstruction 1002 (generated as part of mapping data 1004) relative to the coordinates of the user's current location and trajectory. In response to determining that the user's current location and trajectory relative to a detected obstruction 1002 represented by the mapping data 1004 places the user at risk of collision with the obstruction 1002, the visualization component 408 or another notification component can generate an audible, visual, or audio-visual notification 1006 that warns the wearer of the impending collision. This approach can mitigate risk of a user tripping over foot-level obstructions or bumping his or her head against a head-level obstruction, or colliding with a wall, safety fence, or other obstruction.

If the wearer is currently viewing an augmented or mixed reality presentation of his or her surroundings, this collision notification 1006 may be rendered as a graphical indication overlaid on the user's field of view on or near the source of the potential collision hazard. The notification 1006 may also take the form of an audible warning. This implementation may be particularly useful in assisting wearers with visual impairments to avoid hazardous collisions.

In a variation of these embodiments, local safety shield component 412 (or an equivalent component in the area scanner 810) can be configured to perform object recognition analysis on the mapping data 1004 to identify the type of object or machine the wearer is at risk of colliding with. In such embodiments, the notification 1006 generated by the wearable appliance 206 or area scanner 810 can be customized based on the type of obstacle; e.g., by generating a notification 1006 that identifies the obstruction 1002.

Figure 11:
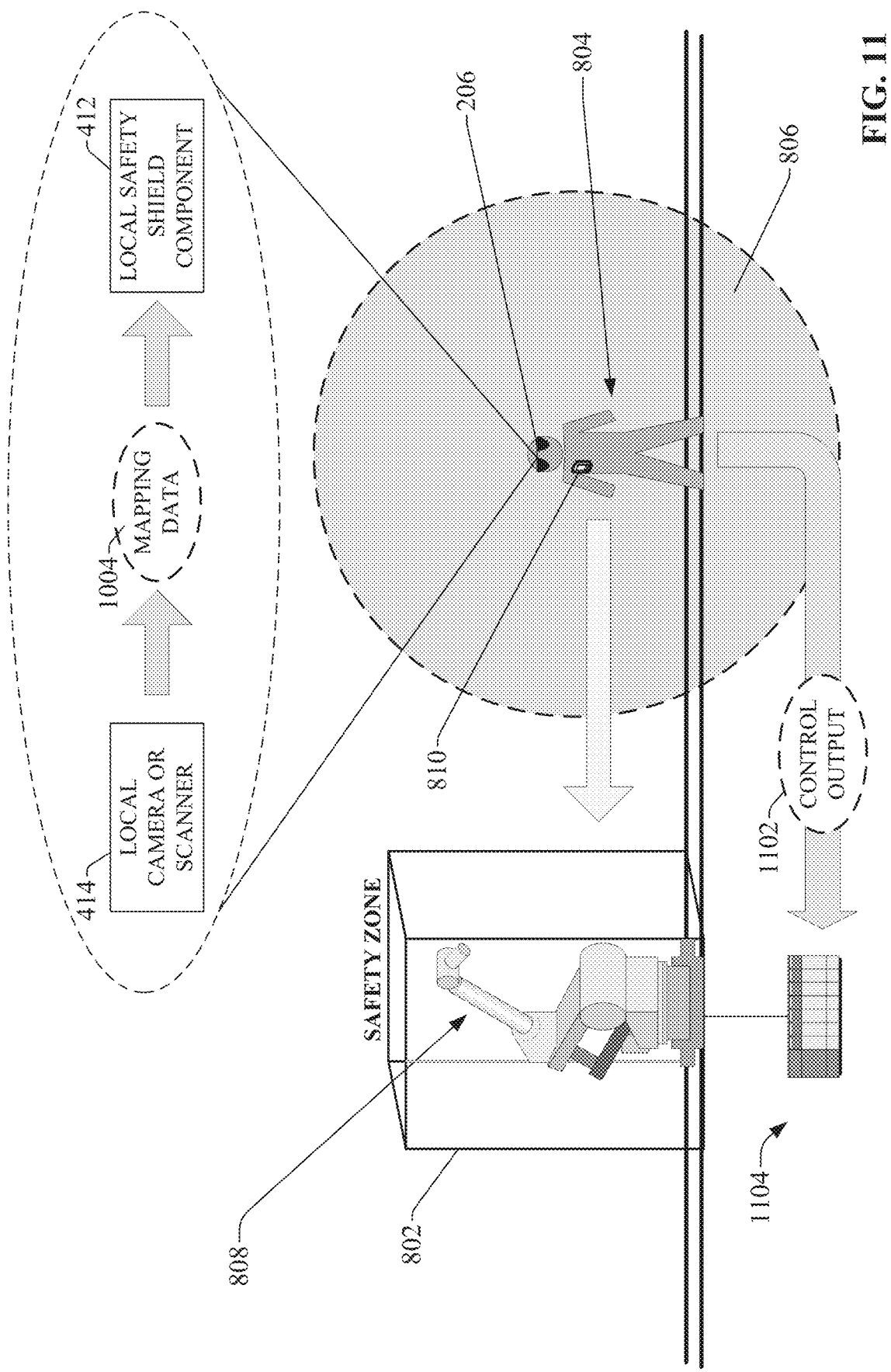
FIG. 11 is a diagram illustrating detection of a machine using local scanning techniques and placement of the machine in a safe state.

As illustrated in FIG. 11, if the detected obstacle is a machine 808 or automation system controlled by an industrial controller 1104 or another type of industrial control device, the wearable appliance 206 or area scanner 810 can generate and send a control output 1102 directed to the machine's controller 1104 that places the machine in a safe state (e.g., a stopped mode or a slow operating mode). The control output 1102 can be sent, for example, by the device communication component 406, which can communicatively interface with the controller 1104 via a wireless network or near field communication, or via a central server that receives the control output 1102 from the device communication component 406 and, in response, sends an appropriate command to the controller 1104 to place the machine in a safe state.

In some embodiments, the identity of the controller 1104 to which the control output is directed 1102 can be determined based on recognition of the machine 808. For example, the wearable appliance 206 or area scanner 810 can determine an identity of a machine 808 within range of the scan based on analysis of the mapping data 1104. In some such embodiments, the local safety shield component 412 may be trained to identify one or more distinguishing characteristics of the machine 808 based on shape or contour of the machine 808 as defined by the mapping data 1004. In other embodiments, the wearable appliance 206 or scanner 810 can be configured to translate a scannable code (e.g., a QR code) or another recognizable marker attached to or otherwise associated with the machine, which uniquely identifies the machine. In still other embodiments, the wearable appliance 206 or scanner 810 can identify the machine based on contextual data obtained from the mapping data 1104 (e.g., location context). Once the machine 808 has been identified, the local safety shield component 412 can reference stored controller identification data that cross-references identities of known machines within the plant with the identities of their corresponding industrial controllers. In this way, the local safety shield component 412 can determine the identity of the controller 1104 corresponding to the machine 808 represented by the mapping data 1004. The controller identification data may also define communication parameters for the controller 1104 (e.g., network addresses, security information, identities of data tags to be written to in order to place the machine 808 in a safe state, etc.) that can be used by the device communication component 406 to establish communication with the controller 1104 and place the machine 808 in a safe state.

In some embodiments, the control action initiated by the wearable appliance 206 or the area scanner 810 in response to detecting a potential interaction between the user and a machine 808 may be a function of the user's role. In such embodiments, the wearable appliance 209 or area scanner 810 can store identity and/or role information for the associated user, and select a safety action based on this identity and/or role information. For example, if the role information indicates that the user has a maintenance or engineering role, the wearable appliance 206 or area scanner 810 may set the control output 1102 to place the machine 808 in a slow operation mode rather than stopping the machine completely. Alternatively, if the role information indicates that the user has an operator role, the wearable appliance 206 or area scanner 810 may set the control output 1102 to place the machine in a stopped mode or to disconnect power from the machine 808.

Notifications (safety shield notifications 612 or notifications delivered by the area scanner 810) can be delivered to the person 804 via any suitable notification format, including but not limited to illumination of a warning light on the person's personal device (wearable appliance 206 or another personal device carried by the user), emission of an audio warning from the person's personal device, force feedback generated by the person's personal device, a vibration-based notification issued by the person's personal device, a graphical indication rendered as part of an augmented reality or mixed reality presentation, or other such feedback. In some implementations, the safety shield notification 612 may also be sent to a warning device mounted near the safety zone 802, such as a stack light, a siren, or another such warning device.

Although the examples described above assume local area scanners 810 that are worn by or otherwise carried by a person 804, in some embodiments the area scanner 810 may be mounted on a vehicle that moves throughout the plant, such as a forklift or truck. In such embodiments, the system can be used to warn drivers when a risk of collision with an obstruction, machine, or person is detected based on analysis of the mapping data 1004.

FIG. 8B is a diagram illustrating another implementation for preventing nuisance trips of an industrial safety system caused by a person 804 entering a safety zone 802. In this alternative implementation, an area scanner 814 is installed within the safety zone 802 rather than being carried by the person 804, thereby creating a scanned area 816 around the safety zone 802 itself. Area scanner 814 is calibrated such that the scanned area 816 is large enough to detect the presence of person 804 before any of the machine's safety input devices are tripped. If the person 804 enters the scanned area 816 created by the area scanner 814, the area scanner 814 or an associated notification system can issue a warning to a suitable device (e.g., an audio or visual warning issued from a device mounted near the safety zone 802; an audio, visual, vibration-based, or force-based warning issued to a client device carried by the person 804; a notification issued to the wearable appliance 206, etc.). As in the example described above in connection with FIG. 8A, this notification can encourage the person 804 to deviate his or her path to avoid the safety zone 802. If the person 804 continues his or her current trajectory and enters the safety zone 802, the zone's safety input devices will detect the person 804 and place the protected equipment in its safe state.

As noted above, time of flight scanners can be used for the area scanners described above in some embodiments. As an alternative to area scanners, a beacon can be installed in or near the safety zone 802 that broadcasts a scanning beam that defines the scanned area 816. The beacon may be an active or passive scanner, and can scan the area surrounding the safety zone 802 using any suitable technology, including but not limited to RFID, wireless, Bluetooth, time of flight, or cellular technologies. The beacon may also be part of satellite-based or local GPS system, creating the scanned area 816 based on monitoring of GPS coordinates. The beacon can be either omnidirectional, or may create a focused scanned area 816 if only a targeted area is to be monitored.

As in the example implementation depicted in FIG. 8A, the notifications can be delivered to the person 804 via any suitable notification format, including but not limited to illumination of a warning light mounted near the safety zone 802 or on the person's personal device, emission of an audio warning from a mounted device or the person's personal device, force feedback generated by the person's personal device, a vibration-based notification issued by the person's personal device, or other such feedback. Multi-level warnings can also be issued in some embodiments, such that the urgency of the warning increases as the person 804 moves closer to the safety zone 802 after entering the scanned area 808.

Because these area scanners or beacons are only intended to reduce nuisance trips of the protected equipment, whereas the safety system itself is responsible for actual operator safety, the scanner-based warning systems are not required to be as accurate as the safety systems, and can therefore be implemented at low cost. For example, whereas an industrial safety system is required to be designed for nearly 100% detection accuracy, the scanner-based warning system can be considerably less accurate while still providing benefit in terms of mitigated nuisance trips (e.g., a warning system that is only 90% accurate will still reduce a considerably number of nuisance trips). In some embodiments however, the scanner-based or beacon-based warning systems can be designed to provide high-integrity functional safety (e.g., SIL-3) in addition to delivering warning notifications.

The virtual safety shield-based, scanner-based, or beacon-based notification systems described above can also be used to alert personnel when they are approaching arc flash zones, hazardous chemicals, intrinsic safety zones, or other hazardous areas or equipment. In some embodiments, the type of warnings that are issued can be based on a role, employment status, or training status of the person 804, since access to an area may be a function of these criteria. Also, in some embodiments, system 302 can issue warnings to other personnel in addition to the person 804 entering the safety zone 802. For example, the system 302 may send notifications to security personnel, a plant manager, or a threat response team that a person 804 with an improper user or role identifier, as determined based on user identification data 602, is detected near the safety zone 802. The system 302 can also log warnings and intrusions in memory 322 for the purposes of maintaining plant records for plant certification.

In some implementations, the virtual safety shield 806 defined and monitored by system 302 can be used to provide safety notifications and initiate safety countermeasures in cases where hazardous machinery is not otherwise protected by safety zones 802 and associated safety systems. This can include identifying when the person is at risk of interacting with mobile hazardous equipment, such as a forklift or other vehicle. In an example embodiment, the vehicle may be fitted with a tracking device that feeds location data to the AR/MR/VR system 302 via device interface component 314. Safety shield component 318 can continually compare the vehicle's location information with the current location and dimensions of a person's virtual safety shield 806. In response to determining that the vehicle's location is within the safe distance from the user, as defined by the virtual safety shield 806, device interface component 314 can issue a safety shield notification 612 that warns the user of his or her proximity to the vehicle. In some embodiments, device interface component 314 can also send a notification to a client device associated with a driver of the vehicle warning the driver of the proximity of the other person. Also, in some embodiments the device interface component 314 can issue an interlock signal to the vehicle itself that disables the vehicle in response to determining that the vehicle has entered the space defined by a person's virtual safety shield 806.

In a variation of this mobile vehicle implementation, safety shield component 318 can be configured to define a virtual safety shield 806 around the vehicle itself based on location data received from a location tracking device mounted on the vehicle. Similar to virtual safety shields 806 defined for human wearers, a virtual safety shield 806 can be defined as being centered around (or otherwise surrounding) the current location of the vehicle-mounted location tracking device and having boundaries defined by a minimum safe distance from the vehicle. Safety shield component 318 can continuously update the space defined by this virtual safety shield based on the current location of the vehicle and compare this monitored space with the tracked locations of people or obstructions within the plant environment (based on location and orientation data 606 received from devices worn by the users, or based on obstacle location and dimension information recorded in plant models 524). In response to determining a current location of a person or obstacle falls within the space defined by vehicle-centric virtual safety shield, safety shield component 318 can instruct client interface component 304 to send a notification 612 to a client device associated with a driver of the vehicle warning the drive of the proximity of the person or obstacle.

In some embodiments, safety shield component 318 can be configured to dynamically alter the size of the vehicle-centric virtual safety shield 806 based on the measured speed of the vehicle to allow for different reaction distances, which are a function of speed. For example, if the vehicle's speed is within a range defined as a slow speed, safety shield component 318 can set the safe distance of the virtual safety shield 806 to be a first distance. If the vehicle's speed is determined to increase to a range defined as a high speed, safety shield component 318 can increase the safe distance of the virtual safety shield 806, thereby increasing the volume of the virtual safety shield 806. In this way, when the vehicle is traveling at faster speeds, safety shield notifications 612 are delivered to the driver when pedestrians or obstacles are at a farther distance from the vehicle, thereby allowing for longer reaction distances associated with faster speeds. This virtual safety shield approach can also be used to warn a driver if the vehicle is on course to improperly pass a stop sign within the plant, based on correlation of the location of the stop sign (as determined from the plant models) and the vehicle-centric virtual safety shield 806.

It is to be appreciated that the various techniques described herein for identifying when a person is at risk of interacting with a hazardous object, machine, vehicle, or safety zone and delivering suitable notifications can be implemented separately in some embodiments, or may be implemented together within the same detection and notification system. For example, some embodiments may detect a risk that a person is about to interface with a hazardous entity or safety zone based on the virtual safety shield implemented by an AR/MR/VR system without the use of an area scanner or beacon, while other embodiments may detect this risk based on an area scanner (either mounted at the safety zone, carried by the person, or both) independently of an AR/MR/VR system or a virtual safety shield. Still other embodiments may leverage a combination of both a virtual safety shield generated by an AR/MR/VR system 302 as well as one or both of a fixed area scanner or a mobile area scanner carried by the person. In general, any combination or permutation of the techniques described herein are within the scope of one or more embodiments of this disclosure. Also, although the virtual safety shield approach has been described herein in connection with an AR/MR/VR system, the safety monitoring and notification techniques described herein can be provided to a user regardless of whether AR/MR/VR content is being delivered to the wearable appliance 206.

FIGS. 12-16 various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 12:
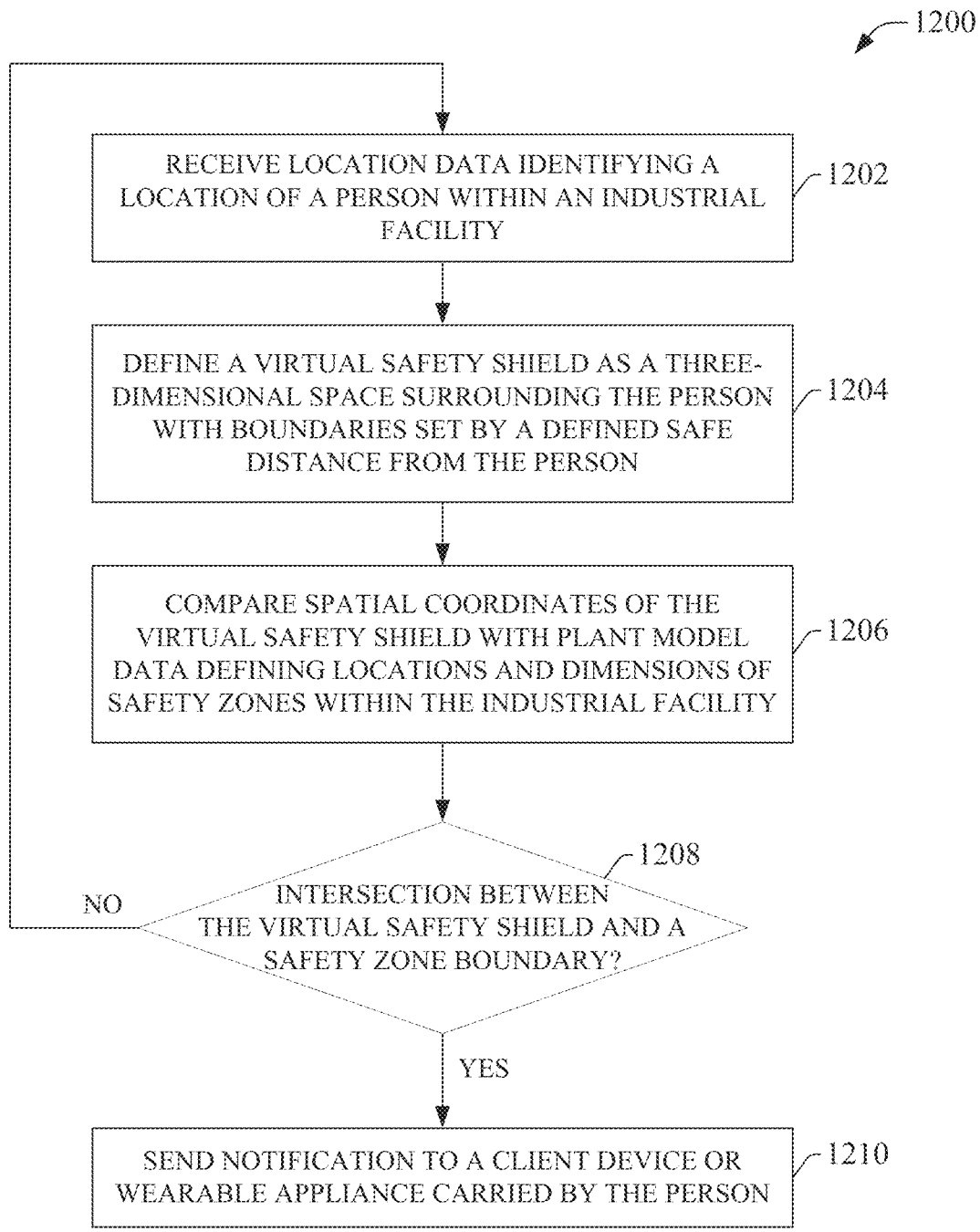
FIG. 12 is a flowchart of an example methodology for delivering warning notifications to a user at risk of tripping a safety system of an industrial safety zone.

FIG. 12 is an example methodology 1200 for delivering warning notifications to a user at risk of tripping a safety system of an industrial safety zone. Initially, at 1202, location data identifying a location of a person within an industrial facility is received. In various embodiments, this location data may be received from a wearable virtual reality, augmented reality, or mixed reality appliance worn by the user or another type of location tracking device carried by the person. At 1204, a virtual safety shield is defined as a three-dimensional space surrounding the person with boundaries set by a defined safe distance from the person. In some embodiments, the safe distance may be equal in all directions from the person, resulting in a spherical virtual safety shield, or may vary depending on the direction from the user, resulting in an irregularly shaped virtual safety shield or a shield having another geometric shape. In some embodiments, the virtual safety shield can be defined and tracked by an AR/MR/VR presentation system, leveraging user location and equipment modeling and mapping information managed by the presentation system for the purposes of generating and delivering AR/MR/VR presentations.

At 1206, spatial coordinates of the virtual safety shield are compared with plant model data defining locations and dimensions of safety zones within the industrial facility. The safety zones may be defined spaces within which hazardous industrial equipment operates, and may be protected by industrial safety systems that each comprise a safety controller and associated safety input devices.

At 1208, a determination is made, based on the comparison performed at step 1206, as to whether an intersection between the virtual safety shield and a safety zone boundary occurs. If no such intersection occurs (NO at step 1208), the methodology returns to step 1202, and steps 1202-1208 repeat. Steps 1202-1208 can repeat continuously such that the location of the virtual safety shield within the plant tracks with the location of the person as determined by the location data received at step 1202. During this time, the virtual safety shield is continually compared with the defined locations of known safety zones within the plant to determine if an intersection occurs.

If an intersection between the virtual safety shield and the safety zone boundary occurs (YES at step 1208), the methodology proceeds to step 1210, where a notification is sent to a client device or wearable appliance carried by the person. The notification can indicate to the person that he or she is at risk of inadvertently tripping a safety input device associated with the safety zone, affording the person an opportunity to change his or her present trajectory to avoid the safety zone.

Figure 13:
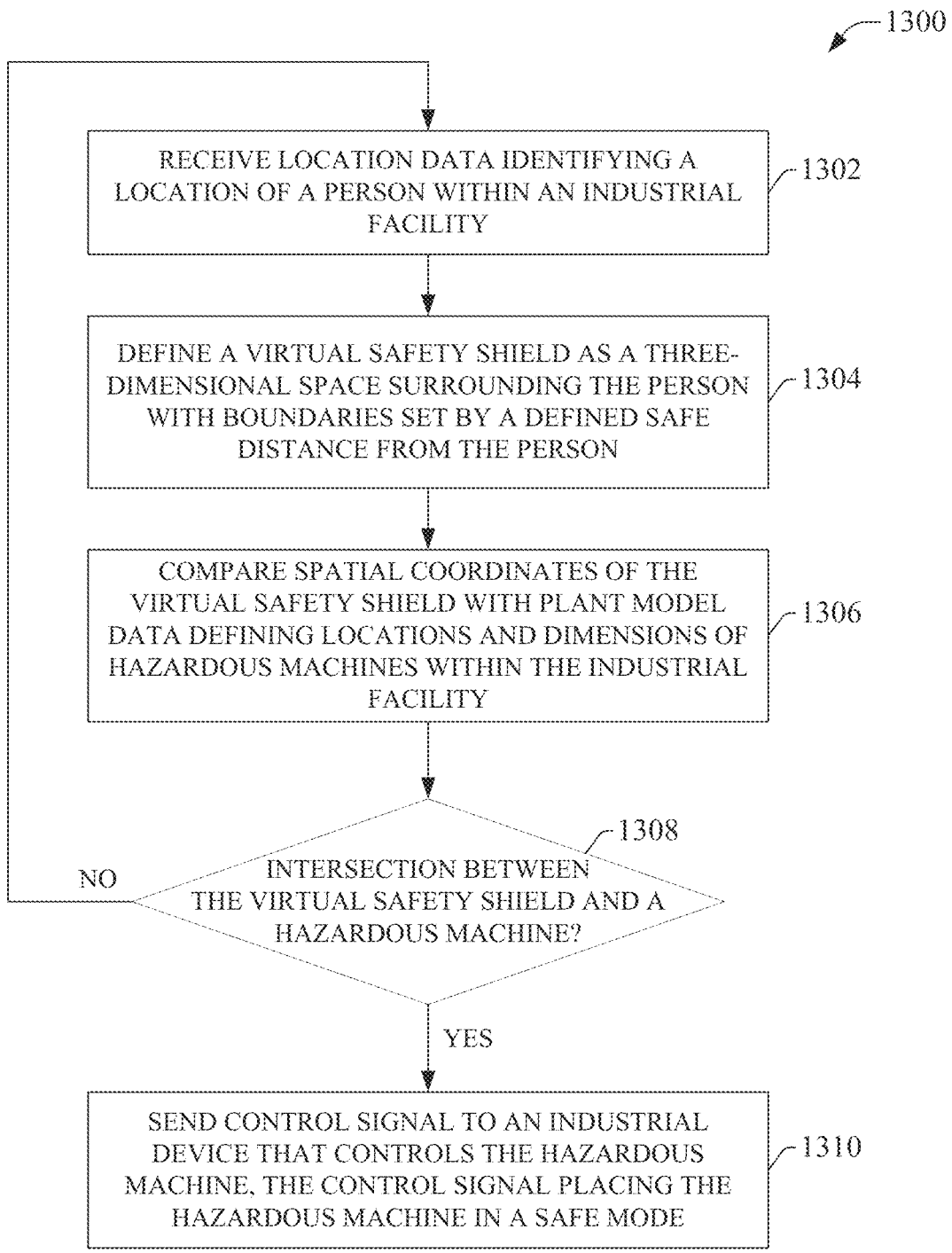
FIG. 13 is a flowchart of an example methodology for placing industrial machinery in a safe operating mode in response to a detected proximity of a person.

FIG. 13 is an example methodology 1300 for placing industrial machinery in a safe operating mode in response to a detected proximity of a person. Initially, at 1302, location data identifying a location of a person within an industrial facility is received (similar to step 1202 of methodology 1200). At 1304, a virtual safety shield is defined as a three-dimensional space surrounding the person with boundaries set by a defined safe distance from the person (similar to step 1204 of methodology 1200).

At 1306, spatial coordinates of the virtual safety shield are compared with plant model data defining locations and dimensions of hazardous machines within the industrial facility. At 1308, a determination is made, based on the comparison performed at step 1306, as to whether an intersection between the virtual safety shield and a hazardous machine has occurred. If no such intersection occurs (NO at step 1308), the methodology returns to step 1302, and steps 1302-1308 repeat. If an intersection occurs (YES at step 1308), the methodology proceeds to step 1310, where a control signal is sent to an industrial device that controls the hazardous machine, the control signal placing the hazardous machine in a safe operating mode. In some embodiments, the virtual safety shield may be multi-layered or tiered, such that the type of control signal sent to the industrial device depends on how close the person is to the hazardous machine. For example, if the hazardous machine only intrudes as far as an outer layer of the virtual safety shield (e.g., between distance d1 and d2 in the example depicted in FIG. 9), the control signal may place the hazardous machine in a slow operating mode (or another first-level safe mode), whereas if the hazardous machine intrudes as far as an inner layer of the virtual safety shield (e.g., less than distance d2 in FIG. 9), the control signal may place the hazardous machine in a stopped mode (or another second-level safe mode, such as disconnecting power from the hazardous machine).

Figure 14:
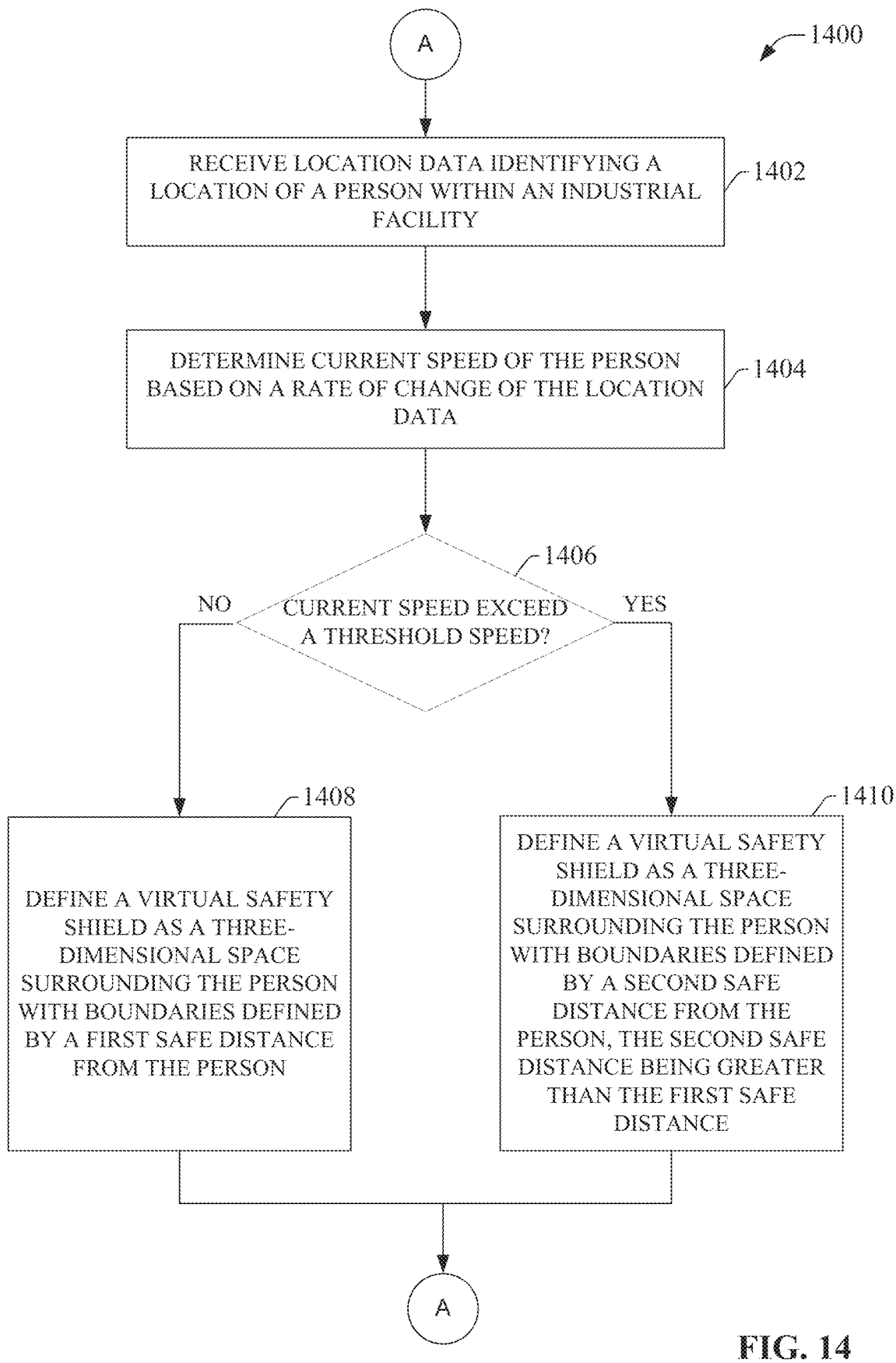
FIG. 14 is a flowchart of an example methodology for dynamically adjusting a size of a virtual safety shield.

FIG. 14 is an example methodology 1400 for dynamically adjusting a size of a virtual safety shield. In some embodiments, methodology 1400 can be executed as part of steps 1204 or 1304 of methodologies 1200 or 1300, respectively. Initially, at step 1402, location data identifying a location of a person within an industrial facility is received. At 1404, a current speed of the person is determined based on a rate of change of the location data.

At 1406, a determination is made as to whether the current speed determined at step 1404 exceeds a threshold speed. If the current speed does not exceed the threshold speed (NO at step 1406), the methodology proceeds to step 1408, where a virtual safety shield is defined as a three-dimensional space surrounding the person with boundaries defined by a first safe distance from a person. Alternatively, if the current speed exceeds the threshold speed (YES at step 1406), the methodology proceeds to step 1410, where the virtual safety shield is defined such that the boundaries are defined by a second safe distance from the person, the second safe distance being greater than the first safe distance.

After either step 1408 or step 1410, the methodology can return to step 1202 and repeat, so that the size of the virtual safety shield is continuously updated as a function of the wearer's current speed.

Figure 15:
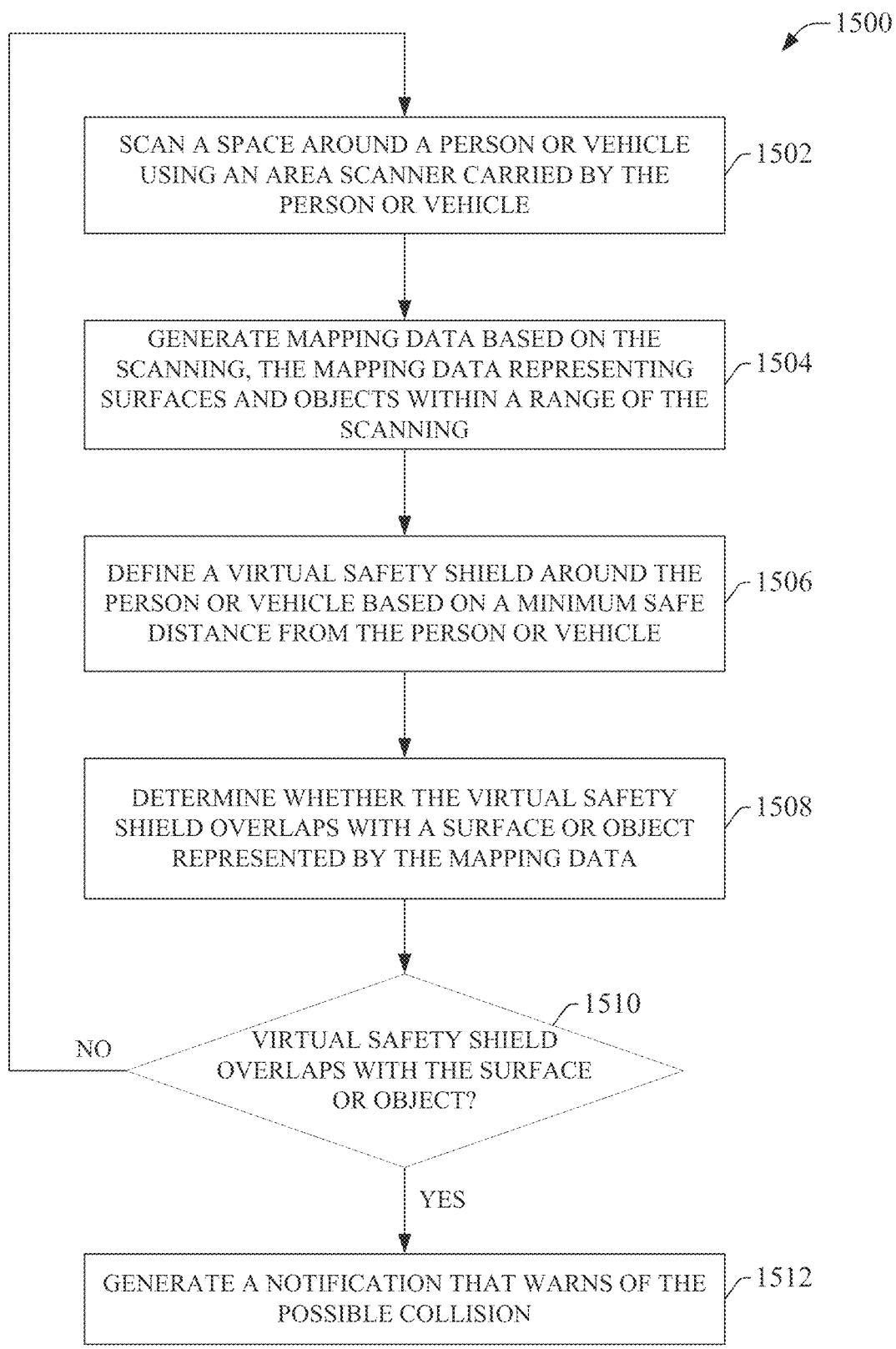
FIG. 15 is a flowchart of an example methodology for dynamically warning a user of potential collisions with objects or surfaces.

FIG. 15 is an example methodology 1500 for dynamically warning a user of potential collisions with objects or surfaces. Initially, at 1502, a space around a person or vehicle is scanned using an areas canner carried by the person or vehicle. The area scanner may be a device carried or worn by a person, or may be integrated into an AR/VR/MR wearable appliance. Scanning technologies that can be used to scene the space around the person or vehicle can include, but are not limited to, radio frequency identification (RFID), wireless networking, near field (e.g. Bluetooth or another near field technology), cellular, GPS-based tracking (e.g., satellite GPS or local in-plant GPS), or other such technologies.

At 1504, mapping data is generated based on the scanning performed at step 1502. The mapping data represents surfaces and objects within a range of the scanning. At 1506, a virtual safety shield is defined around the person or vehicle based on a minimum safe distance from the person or vehicle. The virtual safety shield is defined as a three-dimensional volume around the person or vehicle having boundaries set by the minimum safe distance. In some embodiments, the virtual safety shield can also be defined based on one or more of a pose of the person or vehicle, a trajectory of the person or vehicle, or a velocity of the person or vehicle. For example, the size of the virtual safety shield may be set based on a current velocity of the person or vehicle such that the virtual safety shield increases in size at higher velocities and decreases in size at lower velocities.

At 1508, a determination is made as to whether virtual safety shield overlaps with a surface or object represented by the mapping data generated at step 1504. If the virtual safety shield does not overlap with an object or surface (NO at step 1510), the methodology returns to step 1502 and steps 1502-1510 repeat. If the virtual safety shield overlaps with an object or surface (YES at step 1510), the methodology proceeds to step 1512, where a notification is generated that warns of the possible collision. The notification may be an audio, visual, or tactile notification delivered via the area scanner or via a separate notification device.

Figure 16:
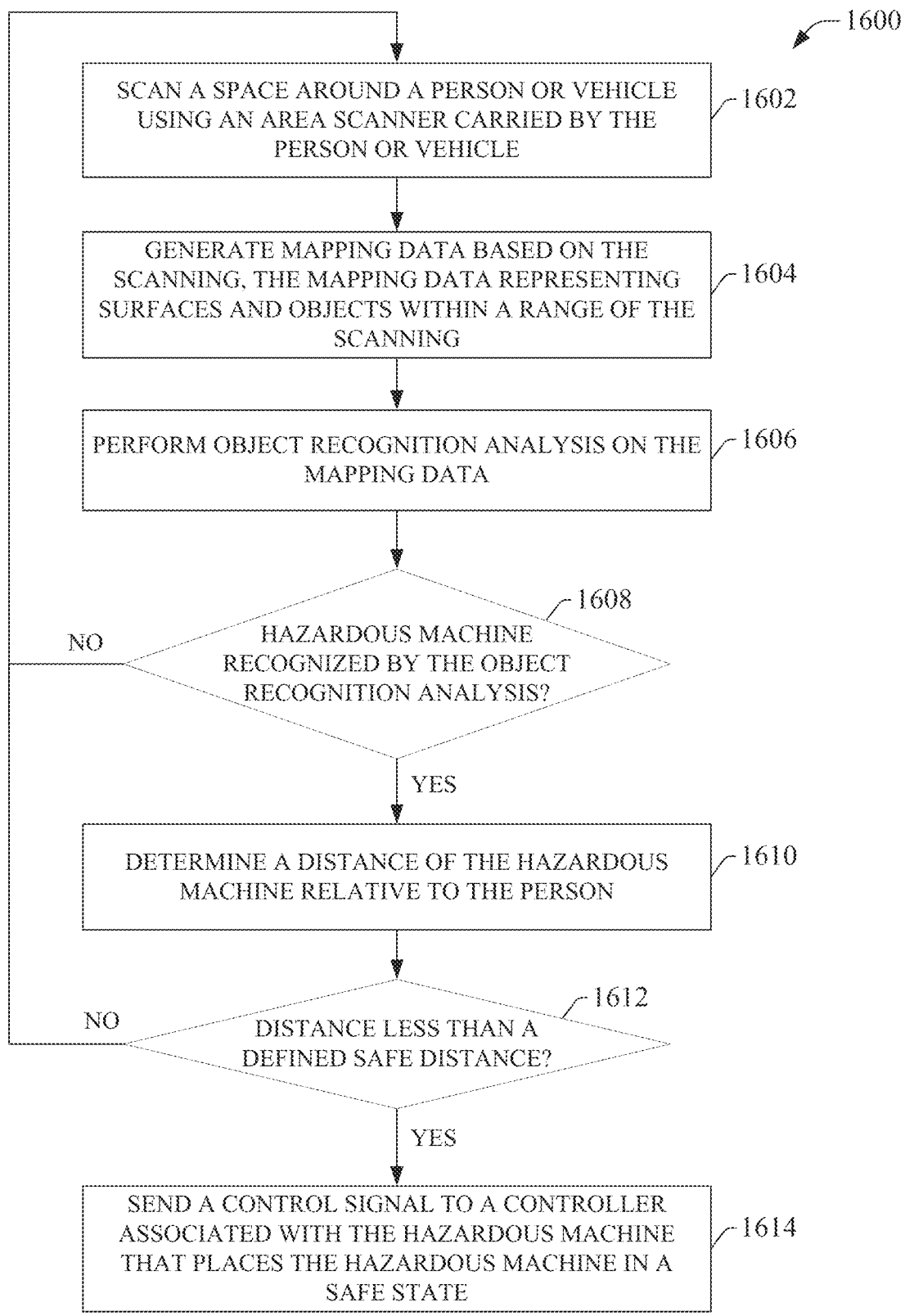
FIG. 16 is a flowchart of an example methodology for preventing hazardous interactions with industrial machinery.

FIG. 16 is an example methodology 1600 for preventing hazardous interactions with industrial machinery. Initially, at 1602, a space around a person or vehicle is scanned using an area scanner carried by a person or vehicle (similar to step 1502 of methodology 1500). At 1604, mapping data is generated based on the scanning performed at step 1602 (similar to step 1504 of methodology 1500).

At 1606, object recognition analysis is performed on the mapping data generated at step 1604. At 1608, a determination is made as to whether the object recognition analysis recognizes the presence of a hazardous machine represented by a portion of the mapping data. In various embodiments, the hazardous machine can be recognized and identified by shape analysis, or by reading a scannable identification code (e.g., a QR code) or other type of readable code affixed to or associated with the machine. If no hazardous machine is recognized, the methodology returns to step 1602, and steps 1602-1608 are repeated. If a hazardous machine is recognized (YES at step 1608), the methodology proceeds to step 1610, where a distance of the hazardous machine relative to the person is determined based on analysis of the mapping data.

At 1612, a determination is made as to whether the distance determined at step 1610 is less than a defined safe distance. If the distance is not less than the defined safe distance (NO at step 1612), the methodology returns to step 1602. If the distance is less than the safe distance (YES at step 1612), the methodology proceeds to step 1614, where a control signal is sent to a controller associated with the hazardous machine that places the hazardous machine in a safe state. In some embodiments, the area scanner can be configured to identify the hazardous machine based on distinguishing characteristics of the machine ascertained from the mapping data. Once the machine has been identified, the area scanner can reference information that cross-references each machine or automation system in a plant facility with the identity of its corresponding industrial controller in order to determine the correct controller to which the control signal is to be sent. Based on this controller identity information, the area scanner can direct the control signal to the controller via a near field connection, via a server that relays the control command to the controller, or via another communication means.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 17:
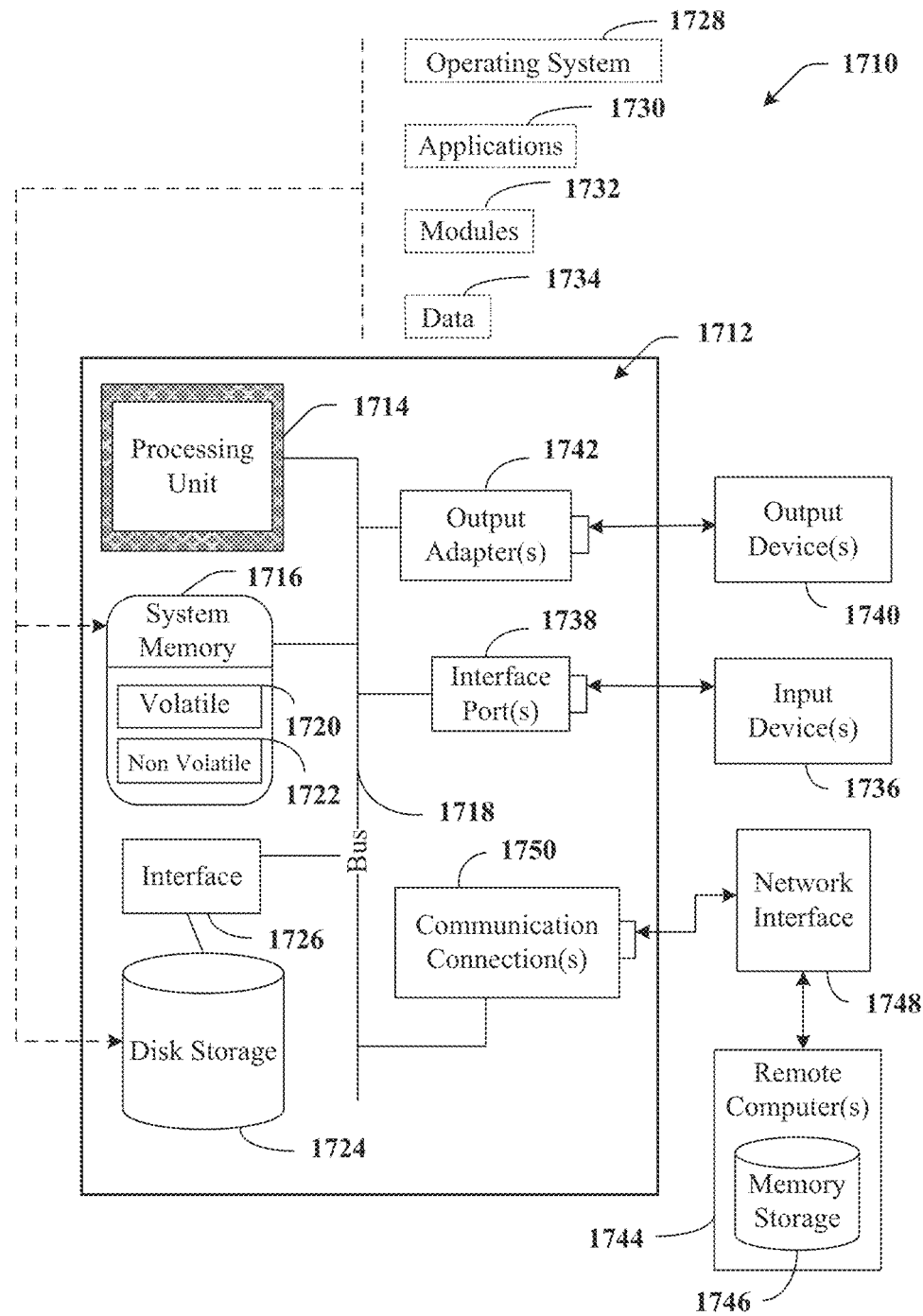
FIG. 17 is an example computing environment.
Figure 18:
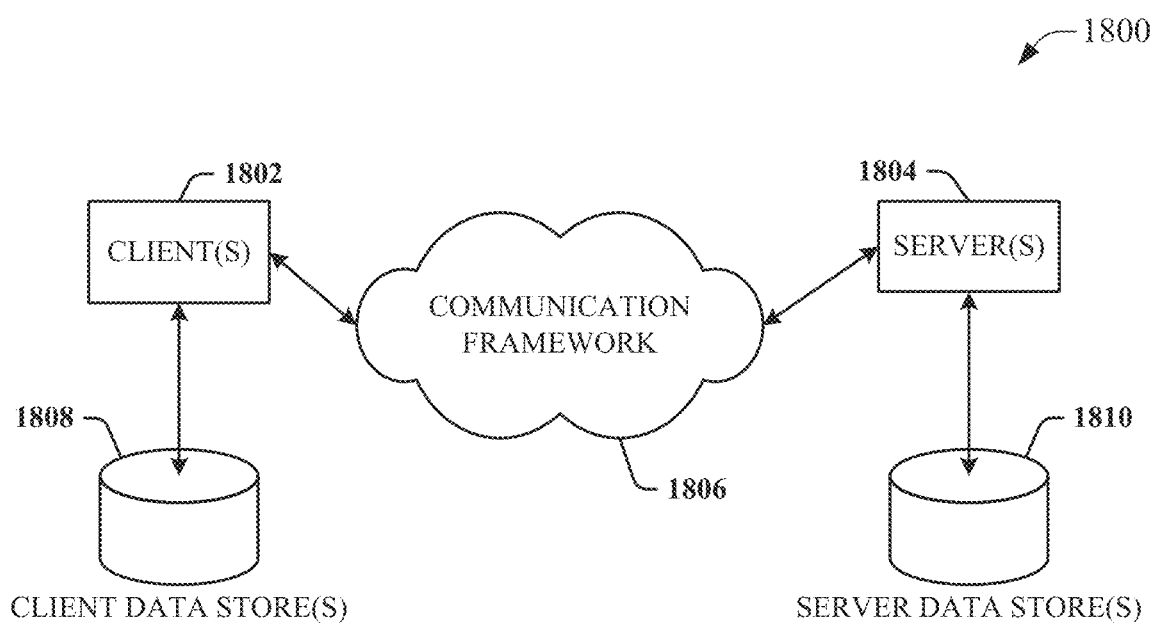
FIG. 18 is an example networking environment.

In order to provide a context for the various aspects of the disclosed subject matter, FIGS. 17 and 18 as well as the following discussion are intended to provide a brief, general description of a suitable environment in which the various aspects of the disclosed subject matter may be implemented.

With reference to FIG. 17, an example environment 1710 for implementing various aspects of the aforementioned subject matter includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Multi-core microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable PROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/non-volatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer 1712. System applications 1730 take advantage of the management of resources by operating system 1728 through program modules 1732 and program data 1734 stored either in system memory 1716 or on disk storage 1724. It is to be appreciated that one or more embodiments of the subject disclosure can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapters 1742 are provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1748 can also encompass near field communication (NFC) or Bluetooth communication.

Communication connection(s) 1750 refers to the hardware/software employed to connect the network interface 1748 to the system bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

FIG. 18 is a schematic block diagram of a sample computing environment 1800 with which the disclosed subject matter can interact. The sample computing environment 1800 includes one or more client(s) 1802. The client(s) 1802 can be hardware and/or software (e.g., threads, processes, computing devices). The sample computing environment 1800 also includes one or more server(s) 1804. The server(s) 1804 can also be hardware and/or software (e.g., threads, processes, computing devices). The servers 1804 can house threads to perform transformations by employing one or more embodiments as described herein, for example. One possible communication between a client 1802 and servers 1804 can be in the form of a data packet adapted to be transmitted between two or more computer processes. The sample computing environment 1800 includes a communication framework 1806 that can be employed to facilitate communications between the client(s) 1802 and the server(s) 1804. The client(s) 1802 are operably connected to one or more client data store(s) 1808 that can be employed to store information local to the client(s) 1802. Similarly, the server(s) 1804 are operably connected to one or more server data store(s) 1810 that can be employed to store information local to the servers 1804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
  a memory that stores executable components; and
  a processor, operatively coupled to the memory, that executes the executable components, the executable components comprising:
    a local scanner component configured to perform a scan of a vicinity surrounding the system and to generate, based on the scan, mapping data representing objects and surfaces within the vicinity; and
    a local safety shield component configured to
      define a three-dimensional virtual safety shield around the local scanner based on a defined minimum safe distance, wherein local safety shield component is configured to increase a size of the virtual safety shield in response to a determination that a velocity or an acceleration of a wearer of the system exceeds a defined threshold or a trajectory of the wearer satisfies a defined criterion, identify, based on a result of an analysis performed on the mapping data, an obstacle within the vicinity surrounding the system, and in response to determining that the virtual safety shield overlaps with the obstacle, generate a notification.

2. The system of claim 1, wherein the system is integrated into at least one of an augmented reality wearable appliance, a hard hat, a bump cap, safety glasses, a safety glove, arc flash protective clothing, safety shoes, earplugs, a forklift, or a body suit.

3. The system of claim 1, wherein
the obstacle is an industrial machine controlled by an industrial controller, and
the system further comprises a device communication component configured to, in response to determining that the virtual safety shield overlaps with the industrial machine, send a control signal to the industrial controller that places the industrial machine in a safe state.

4. The system of claim 3, wherein the device communication component is configured to generate the control signal in accordance with a defined role of the wearer of the system.

5. The system of claim 3, wherein
the local safety shield component is configured to
determine an identity of the industrial machine based on at least one of object recognition analysis performed on the mapping data, a location context, a scannable code associated with the industrial machine, or a marker associated with the industrial machine, and
determine an identity of the industrial controller associated with the identity of the industrial machine based on controller identity data stored on the memory, and
the device communication component is configured to send the control signal to the industrial controller corresponding to the identity of the industrial controller.

6. The system of claim 1, wherein the notification is at least one of an augmented reality graphic rendered on a wearable appliance, a visual indication, an audible indication, or a tactile indication.

7. The system of claim 1, wherein the local scanner component is configured to perform the scan using at least one of radio frequency identification, wireless networking, near field communication, cellular communication, global positioning system tracking, a depth camera, an inertia measurement unit, a red-green-blue (RGB) camera, stereoscope cameras, radio detection and ranging (RADAR), or light detection and ranging (LIDAR).

8. The system of claim 1, wherein the local safety shield component is further configured to determine the trajectory the wearer of the system, and to generate the notification in response to further determining that the trajectory is indicative of a risk of collision with the obstacle.

9. The system of claim 3, wherein the device communication component is configured to send the control signal to the industrial controller via at least one of a wireless network, near field communication, or a server that routes the control signal to the industrial controller.

10. A method, comprising:
scanning, by a system comprising a processor, a space surrounding the system;
generating, by the system based on the scanning, mapping data that models objects and surfaces within the space surrounding the system;
defining, by the system, a three-dimensional virtual safety shield around the system based on a defined minimum safe distance, wherein the defining comprises increasing a size of the virtual safety shield in response to determining that a velocity or an acceleration of a wearer of the system increases in excess of a defined velocity threshold or in response to determining that a trajectory of the wearer of the system satisfies a defined criterion;
identifying, by the system based on a result of an analysis performed on the mapping data, an obstacle within the space surrounding the system; and
in response to determining that the virtual safety shield overlaps with the obstacle, generating, by the system, a notification.

11. The method of claim 10, wherein the system is integrated into at least one of an augmented reality wearable appliance, a hard hat, a bump cap, safety glasses, a safety glove, arc flash protective clothing, safety shoes, earplugs, a forklift, an automated guided vehicle, or a body suit.

12. The method of claim 10, wherein
the identifying the obstacle comprises identifying an industrial machine controlled by an industrial controller, and
the method further comprises:
in response to determining that the virtual safety shield overlaps with the industrial machine, sending, by the system, a control signal to the industrial controller, wherein the control signal transitions the industrial machine to a safe state.

13. The method of claim 12, wherein the sending the control signal comprises generating the control signal to set the safe state based on a role of the wearer of the system.

14. The method of claim 12, wherein the sending the control signal comprises:
determining, by the system, an identity of the industrial machine based on at least one of object recognition analysis performed on the mapping data, a location context, a scannable code associated with the industrial machine, or a marker associated with the industrial machine;
determining an identity of the industrial controller associated with the industrial machine based on a recorded association between the identity of the industrial machine and the identity of the industrial controller; and
sending the control signal to the industrial controller selected based on the identity of the industrial controller.

15. The method of claim 10, wherein the generating the notification comprises generating at least one of an augmented reality graphic rendered on a wearable appliance, a visual indication, an audible indication, or a tactile indication.

16. The method of claim 10, wherein the scanning comprises scanning using at least one of radio frequency identification, wireless networking, near field communication, cellular communication, global positioning system tracking, a depth camera, an inertia measurement unit, a red-greenblue (RGB) camera, stereoscope cameras, radio detection and ranging (RADAR), or light detection and ranging (LIDAR).

17. The method of claim 10, further comprising determining, by the system, the trajectory of the wearer of the system,
wherein the generating further comprises generating the notification in response to further determining that the trajectory is indicative of a risk of collision with the obstacle.

18. The method of claim 12, wherein the sending the control signal comprises sending the control signal to the industrial controller via at least one of a wireless network, near field communication, or a server that routes the control signal to the industrial controller.

19. A non-transitory computer-readable medium having stored thereon instructions that, in response to execution, cause a wearable device comprising a processor to perform operations, the operations comprising:

scanning a vicinity surrounding the wearable device;
generating, based on the scanning, mapping data that describes objects and surfaces within the vicinity;
defining a three-dimensional virtual safety shield around the wearable device based on a defined minimum safe distance, wherein the defining comprises increasing a size of the virtual safety shield in response to determining that a velocity or an acceleration of the wearable device increases in excess of a defined velocity threshold or that a trajectory of the wearable device satisfies a defined criterion;
identifying, based on a result of an analysis performed on the mapping data, an obstacle within the space surrounding the wearable device; and
in response to determining that the virtual safety shield overlaps with the obstacle, generating a notification.

20. The non-transitory computer-readable medium of claim 19, wherein the wearable device is at least one of an augmented reality wearable appliance, a hard hat, a bump cap, safety glasses, a safety glove, arc flash protective clothing, safety shoes, earplugs, or a body suit.

* * * * *